(12) United States Patent
Kamijo

(10) Patent No.: US 7,554,537 B2
(45) Date of Patent: Jun. 30, 2009

(54) BOOSTER CIRCUIT, SEMICONDUCTOR DEVICE, AND DISPLAY DEVICE

(75) Inventor: Haruo Kamijo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1086 days.

(21) Appl. No.: 10/859,249

(22) Filed: Jun. 3, 2004

(65) Prior Publication Data

US 2005/0007185 A1 Jan. 13, 2005

(30) Foreign Application Priority Data

Jun. 19, 2003 (JP) ............................. 2003-175319

(51) Int. Cl.
*G06F 3/038* (2006.01)

(52) U.S. Cl. ..................................... 345/211

(58) Field of Classification Search ......... 345/211–213; 327/536
See application file for complete search history.

(56) References Cited

U.S. PATENT DOCUMENTS 6,459,330 B2 * 10/2002 Yasue .......................... 327/538

2002/0105510 A1 * 8/2002 Tsuchiya ..................... 345/211

FOREIGN PATENT DOCUMENTS

| JP | 06-351229 | 12/1994 |
|---|---|---|
| JP | 2000-330085 | 11/2000 |
| JP | A 2001-211635 | 8/2001 |
| JP | 2003-111386 | 4/2003 |
| JP | 2003-132679 | 5/2003 |
| JP | 2003-164142 | 6/2003 |

* cited by examiner

*Primary Examiner*—Amr Awad
*Assistant Examiner*—Dennis P Joseph
(74) *Attorney, Agent, or Firm*—Oliff & Berridge, PLC

(57) ABSTRACT

A booster circuit including first to Mth power supply lines (M is an integer larger than 3) and first and second charge-pump circuits. Each of the charge-pump circuit has first to (M−2)th boost capacitors, wherein the jth boost capacitor ($1 \leq j \leq M-2$, j is an integer) is connected between the jth power supply line and the (j+1)th power supply line in a first period and is connected between the (j+1)th power supply line and the (j+2)th power supply line in a second period subsequent to the first period. Each of the charge-pump circuits generates a boosted voltage by a charge-pump operation in different phases.

19 Claims, 27 Drawing Sheets

BOOSTER CIRCUIT, SEMICONDUCTOR DEVICE, AND DISPLAY DEVICE

Japanese Patent Application No. 2003-175319, filed on Jun. 19, 2003, is hereby incorporated by reference in its entirety.

BACKGROUND OF THE INVENTION

The present invention relates to a booster circuit, a semiconductor device, and a display device.

A liquid crystal display device including an electro-optical device may be used as a display device. The size and current consumption of an electronic instrument can be reduced by providing a liquid crystal display device in the electronic instrument.

A high voltage is necessary for driving the liquid crystal display device. Therefore, it is preferable that a driver integrated circuit (IC) (semiconductor device in a broad sense) which drives the electro-optical device includes a power supply circuit which generates a high voltage from the viewpoint of cost. In this case, the power supply circuit includes a booster circuit. The booster circuit generates an output voltage Vout for driving a liquid crystal by boosting a voltage between a high-potential-side system power supply voltage VDD and a low-potential-side ground power supply voltage VSS.

BRIEF SUMMARY OF THE INVENTION

According to a first aspect of the present invention, there is provided a booster circuit including a charge-pump circuit, the booster circuit comprising:

first to Mth power supply lines (M is an integer larger than 3); and first and second charge-pump circuits, wherein:

the first charge-pump circuit includes a first group of first to (M−2)th boost capacitors, the j1th boost capacitor ($1 \leq j1 \leq M-2$, j1 is an integer) being connected between the j1th power supply line and the (j1+1)th power supply line in a first period, and connected between the (j1+1)th power supply line and the (j1+2)th power supply line in a second period subsequent to the first period; and the second charge-pump circuit includes a second group of first to (M−2)th boost capacitors, the j2th boost capacitor ($1 \leq j2 \leq M-2$, j2 is an integer) being connected between the j2th power supply line and the (j2+1)th power supply line in the second period, and connected between the (j2+1)th power supply line and the (j2+2)th power supply line in the first period.

According to a second aspect of the present invention, there is provided a booster circuit including a charge-pump circuit, the booster circuit comprising:

first to (N+1)th power supply lines (N is an integer larger than 2); and first and second charge-pump circuits, wherein the first charge-pump circuit includes:

a first group of first to 2Nth switching elements, one end of the first switching element being connected to the first power supply line, one end of the 2Nth switching element being connected to the (N+1)th power supply line, and the remaining switching elements excluding the first and 2Nth switching elements being connected in series between the other end of the first switching element and the other end of the 2Nth switching element; and a first group of first to (N−1)th boost capacitors, one end of each of the boost capacitors being connected to a j1th connection node ($1 \leq j1 \leq 2N-3$, j1 is an odd number) to which the j1th and (j1+1)th switching elements are connected, and the other end of each of the boost capacitors being connected to a (j1+2)th connection node to which the (j1+2)th and (j1+3)th switching elements are connected;

wherein the switching elements are controlled so that one of the m1th switching element ($1 \leq m1 \leq 2N-1$, m1 is an integer) and the (m1+1)th switching element in the first group is exclusively turned ON;

wherein the second charge-pump circuit includes:

a second group of first to 2Nth switching elements, one end of the first switching element being connected to the first power supply line, one end of the 2Nth switching element being connected to the (N+1)th power supply line, and the remaining switching elements excluding the first and 2Nth switching elements being connected in series between the other end of the first switching element and the other end of the 2Nth switching element; and a second group of first to (N−1)th boost capacitors, one end of each of the boost capacitors being connected with a j2th connection node ($1 \leq j2 \leq 2N-3$, j2 is an odd number) to which the j2th and (j2+1)th switching elements are connected, and the other end of the boost capacitor being connected with a (j2+2)th connection node to which the (j2+2)th and (j2+3)th switching elements are connected;

wherein the switching elements are controlled so that one of the m2th switching element ($1 \leq m2 \leq 2N-1$, m2 is an integer) and the (m2+1)th switching element in the second group is exclusively turned ON;

wherein the switching elements are controlled so that the mth switching element ($1 \leq m \leq 2N$, m is an integer) in the first group is turned ON when the mth switching element in the second group is turned OFF in a first period; and wherein the switching elements are controlled so that the mth switching element in the first group is turned OFF when the mth switching element in the second group is turned ON in a second period subsequent to the first period.

According to a third aspect of the present invention, there is provided a booster circuit which outputs a boosted voltage to an output power supply line connected to a load, the booster circuit comprising:

a boosted voltage generation circuit which generates a boosted voltage obtained by boosting a given voltage and supplies the boosted voltage to a boost power supply line;

a switching element which electrically connects the boost power supply line to the output power supply line or disconnects the boost power supply line from the output power supply line;

a charge hold circuit which holds an electric charge of the output power supply line; and a charge supply circuit connected to the output power supply line, wherein the charge supply circuit supplies an electric charge to the output power supply line when the switching element electrically disconnects the boost power supply line from the output power supply line.

According to a fourth aspect of the present invention, there is provided a display device comprising:

a plurality of scanning lines;

a plurality of data lines;

a plurality of pixels;

a scanning driver which drives the scanning lines; and the above semiconductor device which drives the data lines.

DETAILED DESCRIPTION OF THE EMBODIMENTS

Figure 1:
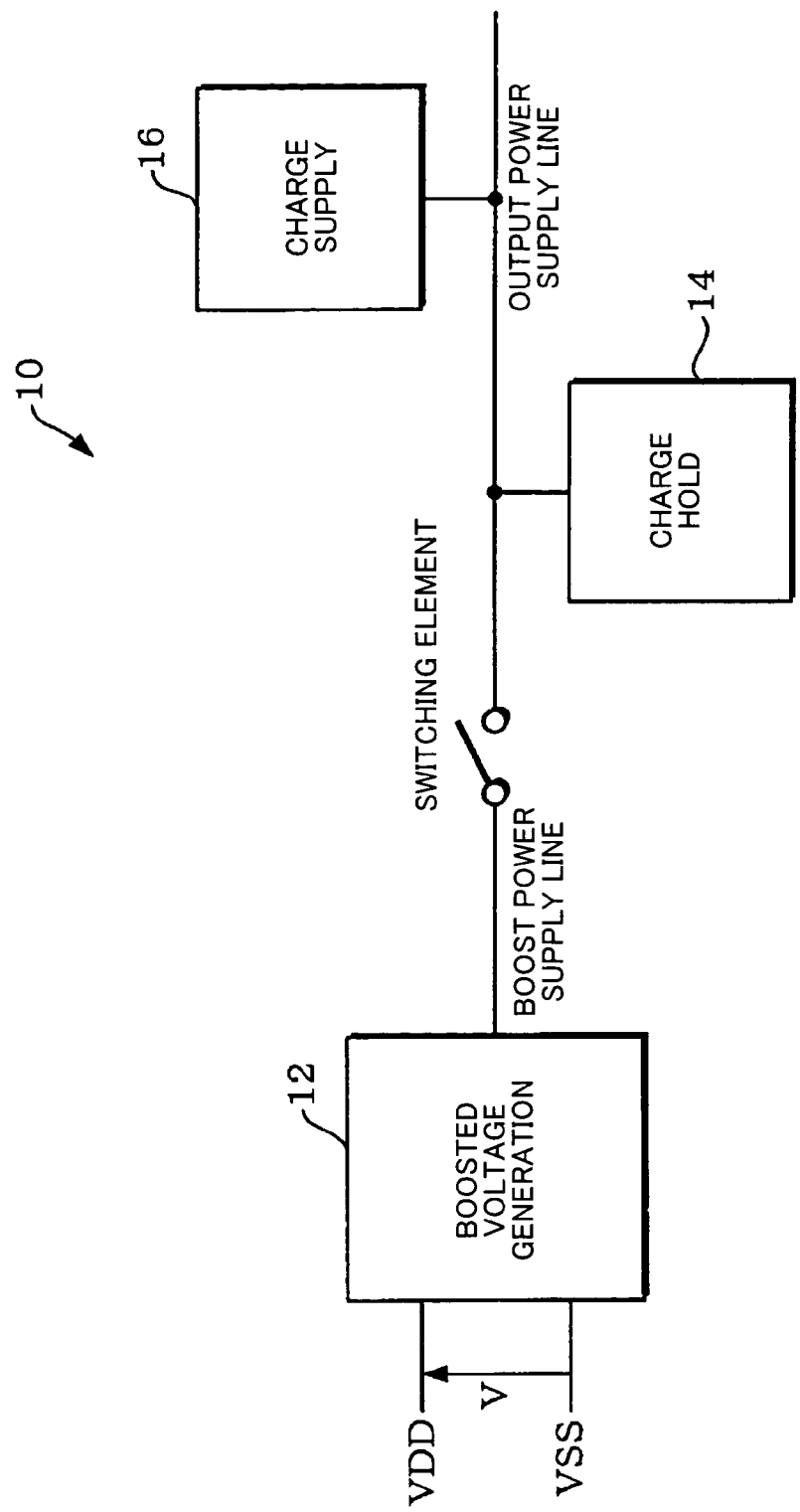
FIG. 1 is a diagram schematically showing the configuration of the booster circuit according to one embodiment of the present invention.

Embodiments of the present invention are described below. Note that the embodiments described hereunder do not in any way limit the scope of the invention defined by the claims laid out herein. Note also that all of the elements described below should not be taken as essential requirements for the present invention.

A reduction of power consumption can be achieved by using a charge-pump circuit which generates a voltage boosted by using a charge-pump method as a booster circuit. The charge-pump circuit includes capacitors. In a liquid crystal panel module including a liquid crystal panel and a driver IC, a mounting step can be simplified and the total cost can be reduced by providing the capacitors of the charge-pump circuit in the IC. Since five capacitors are necessary for a conventional charge-pump circuit which performs voltage boosting by multiplying a voltage five times, it is advantageous to provide the capacitors in the IC from the above viewpoint.

However, in the case where the capacitor of the charge-pump circuit is provided in the driver IC, the area of the capacitor is increased in order to obtain the same capacitance as that of an external capacitor, thereby increasing cost. On the other hand, current consumption is increased by reducing the area of the built-in capacitor. Therefore, the area of the built-in capacitor and current consumption have an inconsistent relationship.

Therefore, in order to reduce the area of the capacitor and cost, a charge-pump type booster circuit which has capacitors of small areas and also has the same capability (charge supply capability and load drive capability) as a conventional booster circuit is demanded. Alternatively, a charge-pump type booster circuit which has the same areas of capacitors (or cost) and capabilities as a conventional booster circuit having capacitors and which can be improved in reduction of current consumption is demanded.

The capacitance of one capacitor provided outside the IC is 0.1 to 1 μF, and the capacitance of one capacitor provided in the IC is about 1 nF. Therefore, in order to obtain the same capability as that of a conventional booster circuit which does not include a capacitor, it is necessary to increase the switching frequency of the switching element of the charge-pump circuit. This increases current consumption due to an increase in the charge/discharge current of the capacitor. Therefore, a charge-pump circuit which reduces the charge/discharge current of the capacitor is demanded.

Moreover, in the charge-pump method, the output voltage Vout drops when current is flown by the load connected with a power supply line to which the output voltage Vout is output.

According to the following embodiments, a booster circuit which reduces power consumption without reducing the load drive capability, and a semiconductor device and a display device including the same can be provided. According to the following embodiments, a booster circuit which stably supplies a boosted voltage, and a semiconductor device and a display device including the same can be provided.

The embodiments of the present invention are described below in detail with reference to the drawings.

1. Booster Circuit

FIG. 1 shows schematic configuration the booster circuit according to one embodiment of this embodiment. A booster circuit 10 outputs a boosted voltage obtained by boosting a voltage V between a system power supply voltage VDD and a ground power supply voltage VSS to an output power supply line. A device (load) which uses the boosted voltage is connected with the output power supply line.

The booster circuit 10 includes a boosted voltage generation circuit 12, a switching element SW, a charge hold circuit 14, and a charge supply circuit 16.

The boosted voltage generation circuit 12 generates a boosted voltage obtained by boosting the voltage V (given voltage) between the system power supply voltage VDD and the ground power supply voltage VSS, and supplies the boosted voltage to a boost power supply line. The switching element SW electrically connects or disconnects the boost power supply line and the output power supply line. The charge hold circuit 14 holds an electric charge of the output power supply line. The charge supply circuit 16 is connected with the output power supply line. The charge supply circuit 16 supplies an electric charge to the output power supply line when the switching element SW electrically disconnects the boost power supply line and the output power supply line. In more detail, the charge supply circuit 16 supplies an electric charge when the switching element SW electrically disconnects the boost power supply line and the output power supply line so that the level of the boosted voltage of the output power supply line is maintained.

Since the booster circuit 10 having such a configuration can maintain the voltage of the output power supply line even in the period in which the boost power supply line and the output power supply line are electrically disconnected, a voltage drop can be prevented even if the current is flown by the load connected with the output power supply line.

The function of the boosted voltage generation circuit 12 (or the boosted voltage generation circuit 12 and the switching element SW, or the boosted voltage generation circuit 12, the switching element SW, and the charge hold circuit 14) is implemented by a charge-pump circuit. The charge-pump circuit further includes switching elements and capacitors. The function of the charge supply circuit 16 is implemented by another charge-pump circuit. Specifically, the booster circuit 10 may include two charge-pump circuits.

However, cost is increased by providing capacitors of a charge-pump circuit having a conventional configuration in an integrated circuit (IC) (semiconductor device in a broad sense). Moreover, current consumption is increased due to the charge/discharge current of the built-in capacitor.

Therefore, a reduction of current consumption and cost and stabilization of the output voltage are achieved by forming each charge-pump circuit of the booster circuit in this embodiment as described below.

2. Charge-pump Circuit

A charge-pump circuit in this embodiment includes a plurality of capacitors, and outputs a voltage boosted by using a charge-pump method.

Figure 2:
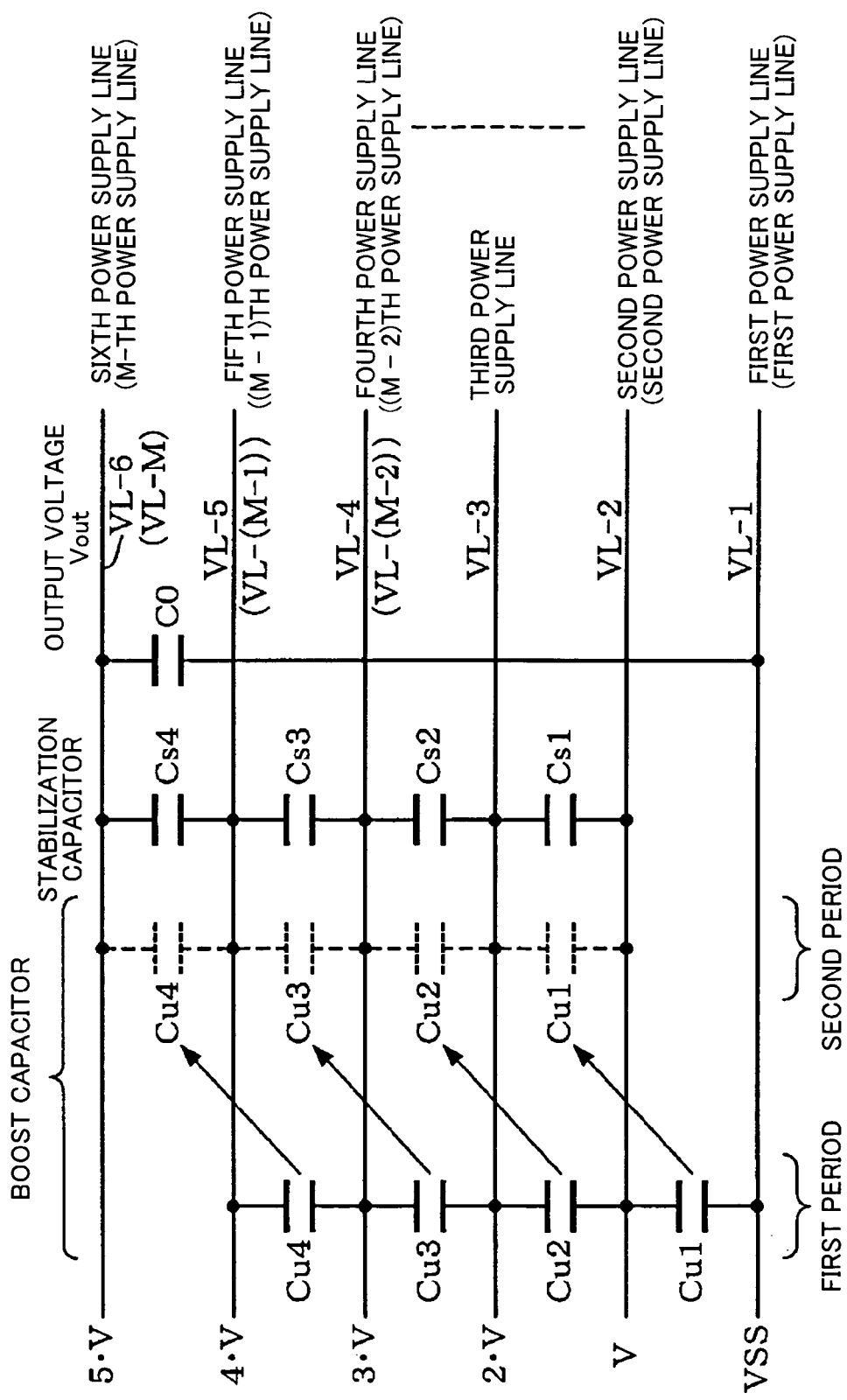
FIG. 2 is a diagram for illustrating the operation of the charge-pump circuit according to one embodiment of the present invention.

FIG. 2 is a diagram for illustrating the operation of the charge-pump circuit in this embodiment. The charge-pump circuit in this embodiment includes first to Mth power supply lines VL-1 to VL-M (M is an integer larger than 3). The charge-pump circuit outputs a boosted voltage $(M-1) \times V$ obtained by multiplying a voltage V between the first and second power supply lines VL-1 and VL-2 (M−1) times to the Mth power supply line VL-M as the output voltage Vout. FIG. 2 shows the operation principle when M is six (when the voltage is multiplied five times).

The charge-pump circuit includes first to (M−2)th boost capacitors Cu1 to Cu(M−2), and first to (M−3)th stabilization capacitors Cs1 to Cs(M−3).

The jth boost capacitor Cuj ($1 \leq j \leq M-2$, j is an integer) among the first to (M−2)th boost capacitors Cu1 to Cu(M−2) is connected between the jth power supply line and the (j+1)th power supply line in a first period. The jth boost capacitor Cuj is connected between the (j+1)th power supply line and the (j+2)th power supply line in a second period subsequent to the first period. Specifically, the power supply lines connected with the jth boost capacitor Cuj are changed corresponding to the first and second periods.

For example, the first boost capacitor Cu1 is connected between the first and second power supply lines VL-1 and VL-2 in the first period, and is connected between the second and third power supply lines VL-2 and VL-3 in the second period. The second boost capacitor Cu2 is connected between the second and third power supply lines VL-2 and VL-3 in the first period, and is connected between the third and fourth power supply lines VL-3 and VL-4 in the second period. The (M−2)th boost capacitor Cu(M−2) is connected between the (M−2)th and (M−1)th power supply lines VL-(M−2) and VL-(M−1) in the first period, and is connected between the (M−1)th and Mth power supply lines VL-(M−1) and VL-M in the second period.

The kth stabilization capacitor Csk ($1 \leq k \leq M-3$, k is an integer) among the first to (M−3)th stabilization capacitors Cs1 to Cs(M−3) is connected between the (k+1)th power supply line and the (k+2)th power supply line. The kth stabilization capacitor Csk stores (is charged with) an electric charge discharged from the kth boost capacitor Cuk in the second period. Specifically, the power supply lines connected with the kth stabilization capacitor Csk are common in the first and second periods.

For example, the first stabilization capacitor Cs1 is connected between the second and third power supply lines VL-2 and VL-3. The first stabilization capacitor Cs1 stores an electric charge discharged from the first boost capacitor Cu1 in the second period. The first stabilization capacitor Cs1 is connected between the second and third power supply lines VL-2 and VL-3 in the second period. The second stabilization capacitor Cs2 is connected between the third and fourth power supply lines VL-3 and VL-4. The second stabilization capacitor Cs2 stores an electric charge discharged from the second boost capacitor Cu2 in the second period. The (M−3)th stabilization capacitor Cs(M−3) is connected between the (M−2)th and (M−1)th power supply lines VL-(M−2) and V-(M−1). The (M−3)th stabilization capacitor Cs(M−3) stores an electric charge discharged from the (M−3)th boost capacitor Cu(M−3) in the second period.

The principle operation of the charge-pump circuit is described below taking the case where M is six as shown in FIG. 2 as an example. The low-potential-side ground power supply voltage VSS is supplied to the first power supply line VL-1. The high-potential-side system power supply voltage VDD is supplied to the second power supply line VL-2. The voltage V is applied between the first and second power supply lines VL-1 and VL-2.

In the first period, the voltage V is applied to the first boost capacitor Cu1. In the second period subsequent to the first period, the first boost capacitor Cu1 is connected between the second and third power supply lines VL-2 and VL-3. Therefore, an electric charge stored in the first boost capacitor Cu1 in the first period is discharged and stored in the first stabilization capacitor Cs1. This causes the third power supply line VL-3 to which one end of the first stabilization capacitor Cs1 is connected to be at a voltage 2×V with respect to the voltage V of the second power supply line VL-2 to which the other end of the first stabilization capacitor Cs1 is connected.

An electric charge stored in the second and third boost capacitors Cu2 and Cu3 in the first period is discharged in the second period, and stored in the second and third stabilization capacitors Cs2 and Cs3, respectively.

As a result, the voltages of the fourth to sixth power supply lines VL-4 to VL-6 respectively become voltages 3×V, 4×V, and 5×V. Specifically, the voltage 5×V is applied between the first and sixth power supply lines VL-1 and VL-6 as the output voltage of the charge-pump circuit.

The booster circuit preferably further includes an (M−2)th stabilization capacitor Cs(M−2) connected between the (M−1)th power supply line VL-(M−1) and the Mth power supply line VL-M, and the (M−2)th stabilization capacitor Cs(M−2) preferably stores an electric charge discharged from the (M−2)th boost capacitor Cu(M−2) in the second period. Specifically, it is preferable that a fourth stabilization capacitor Cs4 be further connected between the fifth and sixth power supply lines VL-5 and VL-6 when M is six. In FIG. 2, the fourth stabilization capacitor Cs4 corresponding to the (M−2)th stabilization capacitor Cs(M−2) is connected. In this case, the output voltage Vout boosted in the second period can be supplied in a stable state by the fourth stabilization capacitor Cs4.

In FIG. 2, the booster circuit preferably further includes a capacitor connected between the first power supply line VL-1 and the Mth power supply line VL-M. Specifically, it is preferable that a capacitor be connected between the first and sixth power supply lines VL-1 and VL-6 when M is six. In FIG. 2, a capacitor C0 is connected between the first and sixth power supply lines VL-1 and VL-6 corresponding to the first and Mth power supply lines VL-1 and VL-M, respectively. In this case, a decrease in the voltage level due to the load connected with the sixth power supply line VL-6 can be prevented.

Figure 3:
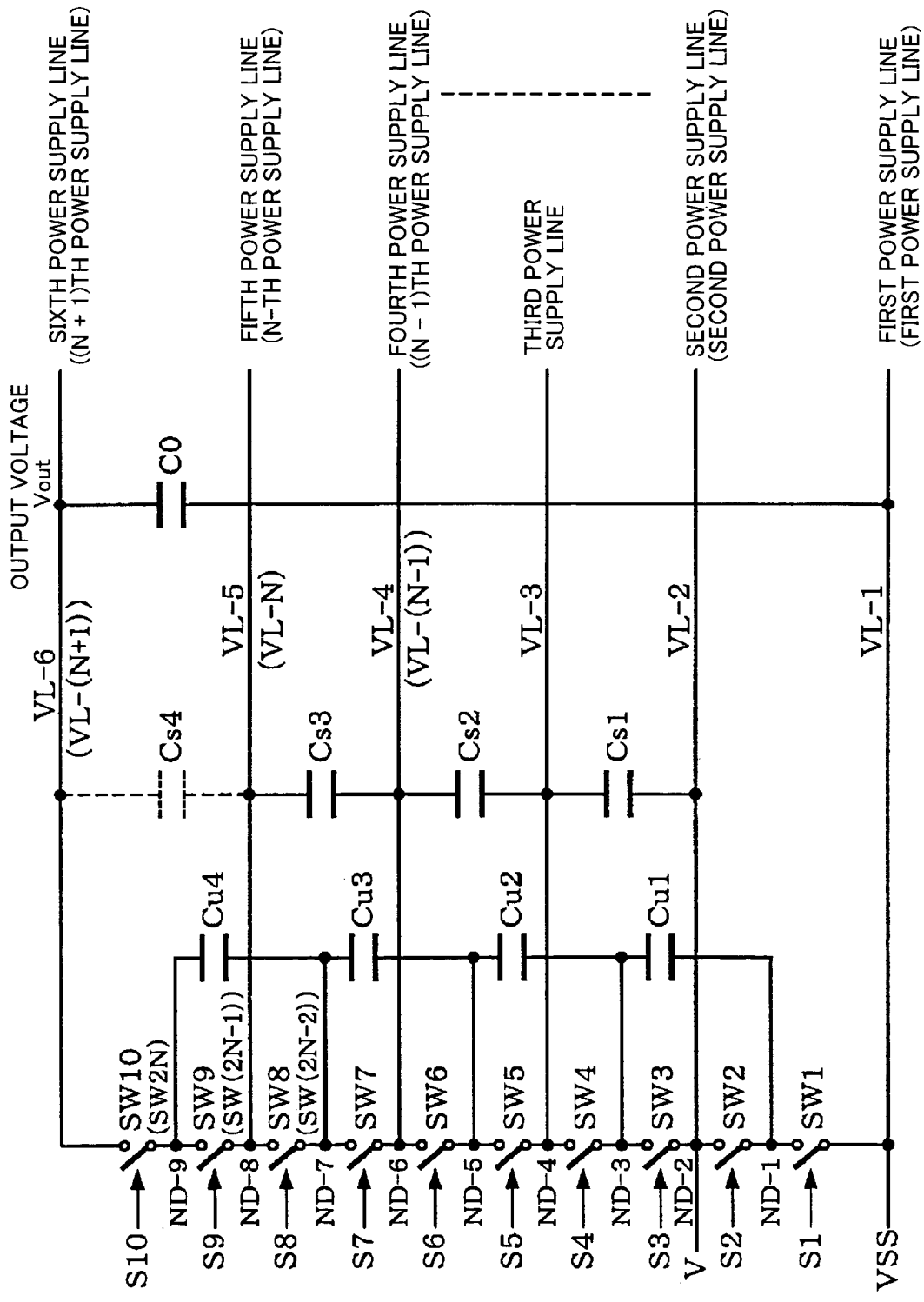
FIG. 3 is a diagram showing the configuration of the charge-pump circuit shown in FIG. 2.

FIG. 3 shows the configuration the charge-pump circuit shown in FIG. 2. In this charge-pump circuit of FIG. 3, the power supply lines connected with each boost capacitor in the first and second periods are changed by controlling switching elements so that one of two switching elements connected in series between two power supply lines is exclusively turned ON.

The charge-pump circuit of FIG. 3 includes the first to (N+1)th power supply lines VL-1 to VL-(N+1) (N is an integer larger than 2). The charge-pump circuit outputs a boosted voltage N×V obtained by multiplying the voltage V between the first and second power supply lines VL-1 and VL-2N times to the (N+1)th power supply line VL-(N+1) as the output voltage Vout. FIG. 3 shows the configuration example when N is five (when the voltage is multiplied five times).

The charge-pump circuit includes first to 2Nth switching elements SW1 to SW2N, first to (N−1)th boost capacitors Cu1 to Cu(N−1), and first to (N−2)th stabilization capacitors Cs1 to Cs(N−2).

The first to 2Nth switching elements are connected in series between the first and (N+1)th power supply lines VL-1 and VL-(N+1). In more detail, one end of the first switching element SW1 is connected with the first power supply line VL-1, and one end of the 2Nth switching element SW2N is connected with the (N+1)th power supply line VL-(N+1). The remaining switching elements SW2 to SW(2N−1) excluding the first and 2Nth switching elements SW1 and SW2N are connected in series between the other end of the first switching element SW1 and the other end of the 2Nth switching element SW2N.

One end of each of the first to (N−1)th boost capacitors Cu1 to Cu(N−1) is connected with a jth connection node ND-j (1≦j≦2N−3, j is an odd number) to which the jth and (j+1)th switching elements SWj and SW(j+1) are connected. The other end of the boost capacitor is connected with the (j+2)th connection node ND-(j+2) to which the (j+2)th and (j+3)th switching elements SW(j+2) and SW(j+3) are connected.

Specifically, the first boost capacitor Cu1 is connected between the first and third connection nodes ND-1 and ND-3. The first connection node ND-1 is a node to which the first and second switching elements SW1 and SW2 are connected, and the third connection node ND-3 is a node to which the third and fourth switching elements SW3 and SW4 are connected. The second boost capacitor Cu2 is connected between the third and fifth connection nodes ND-3 and ND-5. The fifth connection node ND-5 is a node to which the fifth and sixth switching elements SW5 and SW6 are connected. The (N−1)th boost capacitor Cu(N−1) is connected between the (2N−3)th and (2N−1)th connection nodes ND-(2N−3) and ND-(2N−1). The (2N−3)th connection node ND-(2N−3) is a node to which the (2N−3)th and (2N−2)th switching elements SW(2N−3) and SW(2N−2) are connected, and the (2N−1)th connection node ND-(2N−1) is a node to which the (2N−1)th and 2Nth switching elements SW(2N−1) and SW2N are connected.

In FIG. 3, one end of each of the first to (N−2)th stabilization capacitors Cs1 to Cs(N−2) is connected with the kth connection node ND-k (2≦k≦2N−4, k is an even number) to which the kth and (k+1)th switching elements SWk and SW(k+1) are connected. The other end of the stabilization capacitor is connected with the (k+2)th connection node ND-(k+2) to which the (k+2)th and (k+3)th switching elements SW(k+2) and SW(k+3) are connected.

Specifically, the first stabilization capacitor Cs1 is connected between the second and fourth connection nodes ND-2 and ND-4. The second connection node ND-2 is a node to which the second and third switching elements SW2 and SW3 are connected, and the fourth connection node ND-4 is a node to which the fourth and fifth switching elements SW4 and SW5 are connected. The second stabilization capacitor Cs2 is connected between the fourth and sixth connection nodes ND-4 and ND-6. The sixth connection node ND-6 is a node to which the sixth and seventh switching elements SW6 and SW7 are connected. The (N−2)th stabilization capacitor Cs(N−2) is connected between the (2N−4)th and (2N−2)th connection nodes ND-(2N−4) and ND-(2N−2). The (2N−4)th connection node ND-(2N−4) is a node to which the (2N−4)th and (2N−3)th switching elements SW(2N−4) and SW(2N−3) are connected, and the (2N−2)th connection node ND-(2N−2) is a node to which the (2N−2)th and (2N−1)th switching elements SW(2N−2) and SW(2N−1) are connected.

In the charge-pump circuit shown in FIG. 3, the switching elements are controlled so that one of the mth switching element SWm (1≦m<2N−1, m is an integer) and the (m+1)th switching element SW(m+1) is exclusively turned ON, and the voltage N×V obtained by multiplying the voltage between the first and second power supply lines N times is output between the first and (N+1)th power supply lines VL-1 and VL-(N+1).

Figure 4:
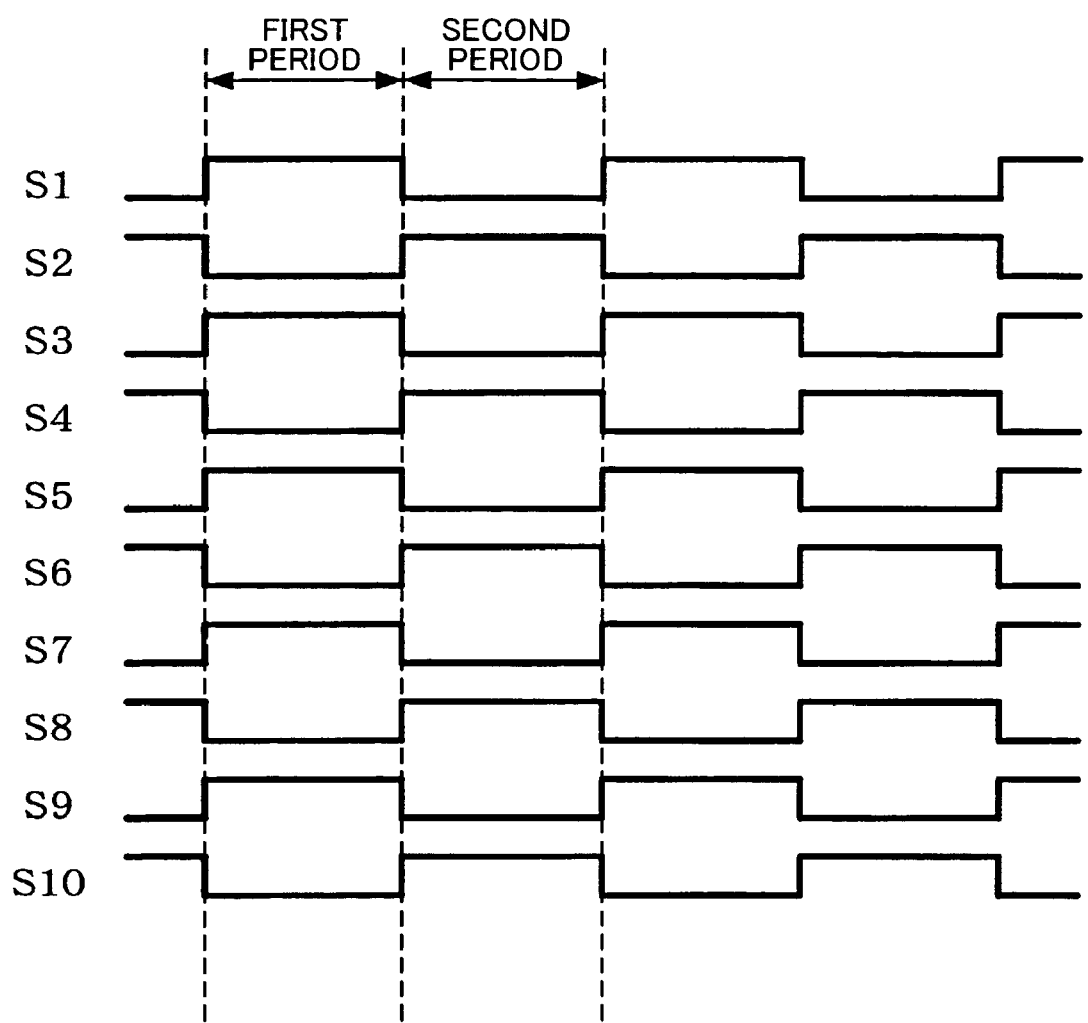
FIG. 4 is a timing chart schematically showing the operation of the switch control signals shown in FIG. 3.

FIG. 4 schematically shows the operation of switch control signals which controls the switching elements in FIG. 3.

In FIG. 4, a switch control signal which controls (ON/OFF controls) the first switching element SW1 is denoted by S1, a switch control signal which controls the second switching element SW2 is denoted by S2, and a switch control signal which controls the 2Nth switching element SW2N is denoted by S2N. FIG. 4 schematically shows an operation timing of the switch control signals S1 to S10 when N is five. The switch control signal is a clock signal which repeats the operation shown in FIG. 4.

The switching element is turned ON by the switch control signal at an H level, whereby both ends of the switching element are electrically connected and the switching element is in a conducting state. The switching element is turned OFF by the switch control signal at an L level, whereby both ends of the switching element are electrically disconnected and the switching element is in a nonconducting state.

The switch control signals S1, S3, . . . , and S9 are set at an H level in the first period, and set at an L level in the second period. The switch control signals S2, S4, . . . , and S10 are set at an L level in the first period, and set at an H level in the second period. The switching elements are controlled in this manner so that one of the mth switching element SWm and the (m+1)th switching element SW(m+1) is exclusively turned ON.

It is preferable that the switching elements be controlled so that a period in which the mth switching element SWm and the (m+1)th switching element SW(m+1) are turned ON at the same time does not exist. This is because current consumption is increased due to shoot-through current if the mth switching element SWm and the (m+1)th switching element SW(m+1) are turned ON at the same time. In FIG. 4, the second period is a period immediately after the first period. However, the present invention is not limited thereto. For example, the second period may start when a predetermined period has elapsed after the first period. It suffices that the second period start after the first period has elapsed.

The operation of the charge-pump circuit shown in FIG. 3 is described below with reference to FIGS. 5A and 5B taking the case where N is five (when the voltage is multiplied five times) as an example.

Figure 5A:
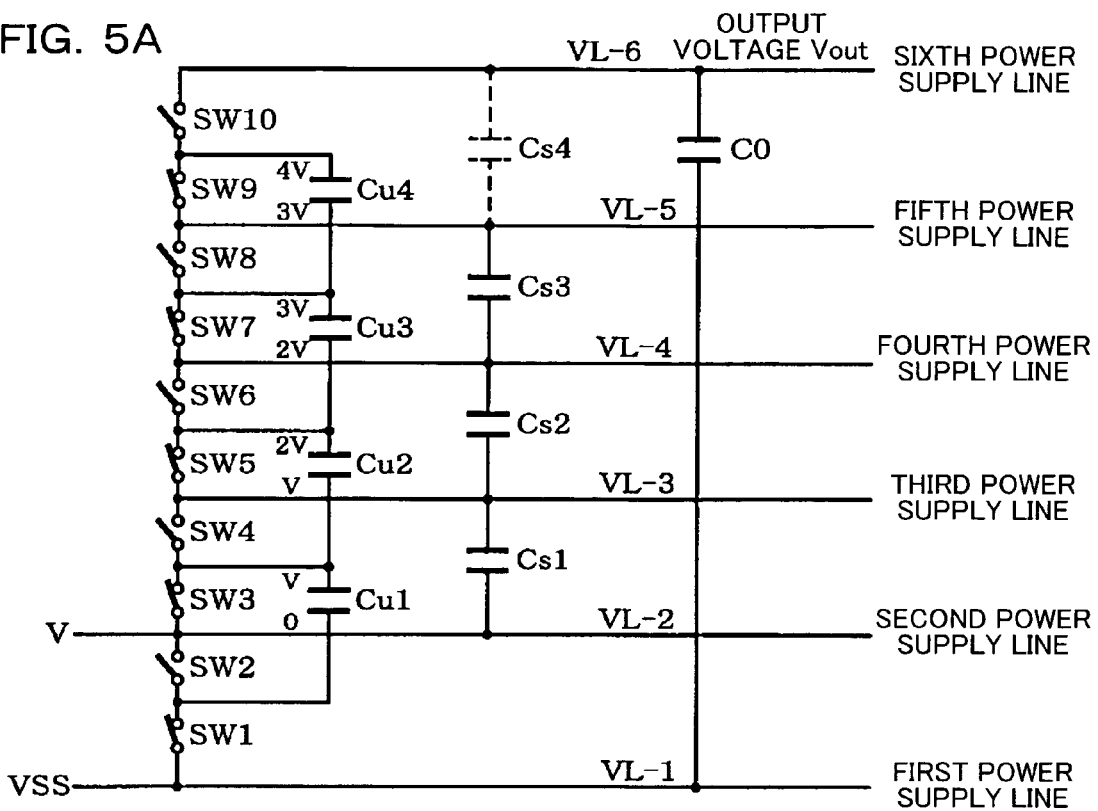
FIG. 5A shows a switching state of the charge-pump circuit of FIG. 3 in the first period.

FIG. 5A schematically shows a switching state of the charge-pump circuit shown in FIG. 3 in the first period. FIG. 5B schematically shows a switching state of the charge-pump circuit shown in FIG. 3 in the second period.

In the first period, the first, third, fifth, seventh, and ninth switching elements SW1, SW3, SW5, SW7, and SW9 are turned ON, and the second, fourth, sixth, eighth, and tenth switching elements SW2, SW4, SW6, SW8, and SW10 are turned OFF (FIG. 5A). The voltage V (V, 0) between the first and second power supply lines VL-1 and VL-2 is applied to the first boost capacitor Cu1 in the first period. Therefore, an electric charge is stored in the first boost capacitor Cu1 in the first period so that the voltage of the first boost capacitor Cu1 becomes V.

Figure 5B:
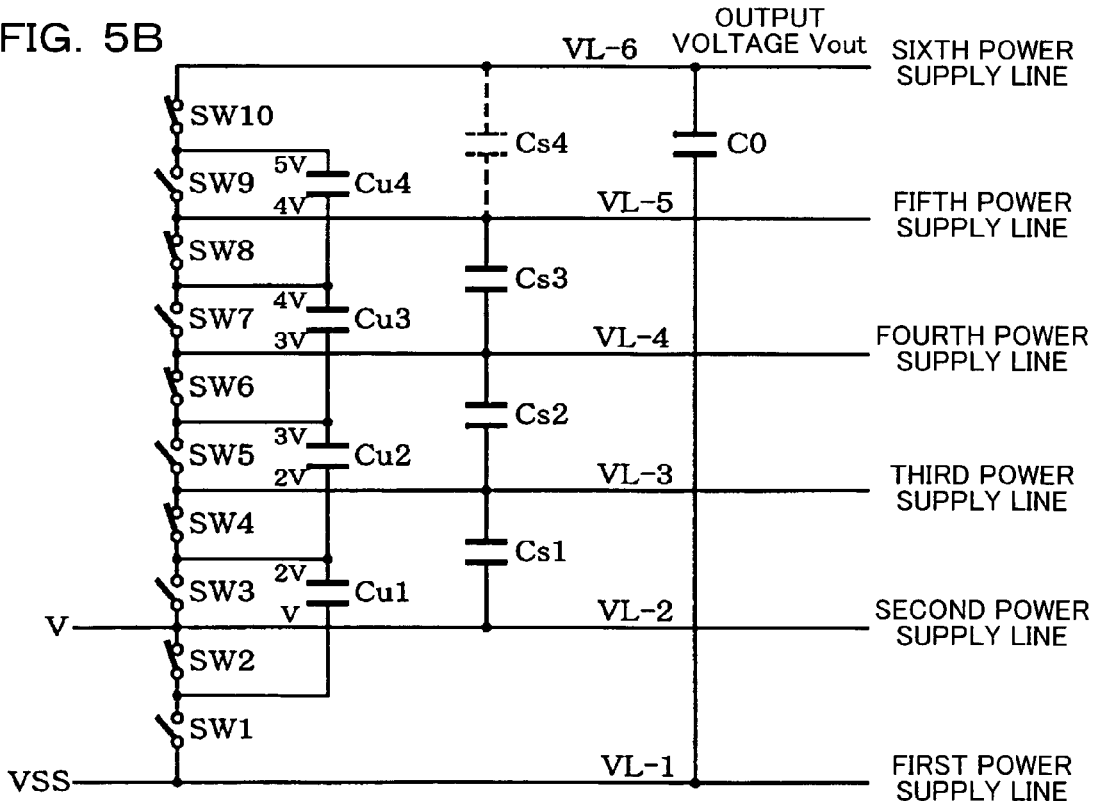
FIG. 5B shows a switching state of the charge-pump circuit of FIG. 3 in the second period.

In the second period, the first, third, fifth, seventh, and ninth switching elements SW1, SW3, SW5, SW7, and SW9 are turned OFF, and the second, fourth, sixth, eighth, and tenth switching elements SW2, SW4, SW6, SW8, and SW10 are turned ON (FIG. 5B). This causes the second power supply line VL-2 to be connected with one end of the first boost capacitor Cu1 instead of the first power supply line VL-1. Therefore, the other end of the first boost capacitor Cu1 is at a voltage 2×V. Since the other end of the first boost capacitor Cu1 is connected with the third power supply line VL-3, the voltage V is also applied to the first stabilization capacitor Cs1 connected between the second and third power supply lines VL-2 and VL-3, and an electric charge is stored in the first stabilization capacitor Cs1 so that the voltage of the first stabilization capacitor Cs1 becomes V. This allows the voltage of the other end of the first stabilization capacitor Cs1 to be 2×V.

The above description also applies to the second boost capacitor Cu2. Specifically, the second power supply line VL-2 is connected with one end of the second boost capacitor Cu2 in the first period. The voltage V is supplied to the second power supply line VL-2. However, the other end of the first boost capacitor Cu1 is connected with the second power supply line VL-2. The other end of the first stabilization capacitor Cs1 is connected with the other end of the second boost capacitor Cu2. Therefore, the voltage V (2V, V) is applied to the second boost capacitor Cu2. Therefore, an electric charge is stored in the second boost capacitor Cu2 in the first period so that the voltage of the second boost capacitor Cu2 becomes V.

The voltage of the other end of the first boost capacitor Cu1 becomes 2×V in the second period. Therefore, the voltage of the other end of the second boost capacitor Cu2 of which one end is connected to the first boost capacitor Cu1 becomes 3×V. Since the other end of the second boost capacitor Cu2 is connected with the fourth power supply line VL-4, the voltage V is applied to the second stabilization capacitor Cs2 connected between the third and fourth power supply lines VL-3 and VL-4, and an electric charge is stored in the second stabilization capacitor Cs2 so that the voltage of the second stabilization capacitor Cs2 becomes V.

The voltage of the other end of the third and fourth boost capacitors Cu3 and Cu4 becomes a voltage boosted by using the charge-pump method in the same manner as described above. As a result, the voltage of the sixth power supply line VL-6 becomes 5×V, and is output as the output voltage Vout.

In FIGS. 3, 5A, and 5B, the booster circuit preferably further includes an (N−1)th stabilization capacitor Cs(N−1) connected between the Nth power supply line VL-N and the (N+1)th power supply line VL-(N+1), and the (N−1)th stabilization capacitor Cs(N−1) preferably stores an electric charge discharged from the (N−1)th boost capacitor Cu(N−1) in the second period. Specifically, it is preferable that the fourth stabilization capacitor Cs4 be further connected between the fifth and sixth power supply lines VL-5 and VL-6 when N is five. In FIGS. 3, 5A, and 5B, the fourth stabilization capacitor Cs4 corresponding to the (N−1)th stabilization capacitor Cs(N−1) is indicated by broken lines. In this case, the output voltage Vout boosted in the second period can be supplied in a stable state by the fourth stabilization capacitor Cs4.

In FIGS. 3, 5A, and 5B, the booster circuit preferably further includes a capacitor connected between the first power supply line VL-1 and the (N+1)th power supply line VL-(N+1). Specifically, it is preferable that a capacitor be connected between the first and sixth power supply lines VL-1 and VL-6 when N is five. In FIGS. 3, 5A, and 5B, the capacitor C0 is connected between the first and sixth power supply lines VL-1 and VL-6 corresponding to the first and (N+1)th power supply lines VL-1 and VL-(N+1). In this case, a decrease in the voltage level due to the load connected with the sixth power supply line VL-6 can be prevented.

A voltage equal to the voltage V between the first and second power supply lines VL-1 and VL-2 is applied to each boost capacitor and each stabilization capacitor by forming the charge-pump circuit as described above. It suffices that each switching element is resistant to a signal having an amplitude of the voltage V or 2×V instead of the boosted voltage N×V, as described later. Therefore, in the case of providing each boost capacitor and each stabilization capacitor in the IC, the switching element and the capacitor can be formed by using a low-voltage manufacturing process which implements reduction of cost without using a high-voltage resistant manufacturing process which is resistant to a voltage N×V.

2.1 Semiconductor Device Including Capacitor

Figure 6:
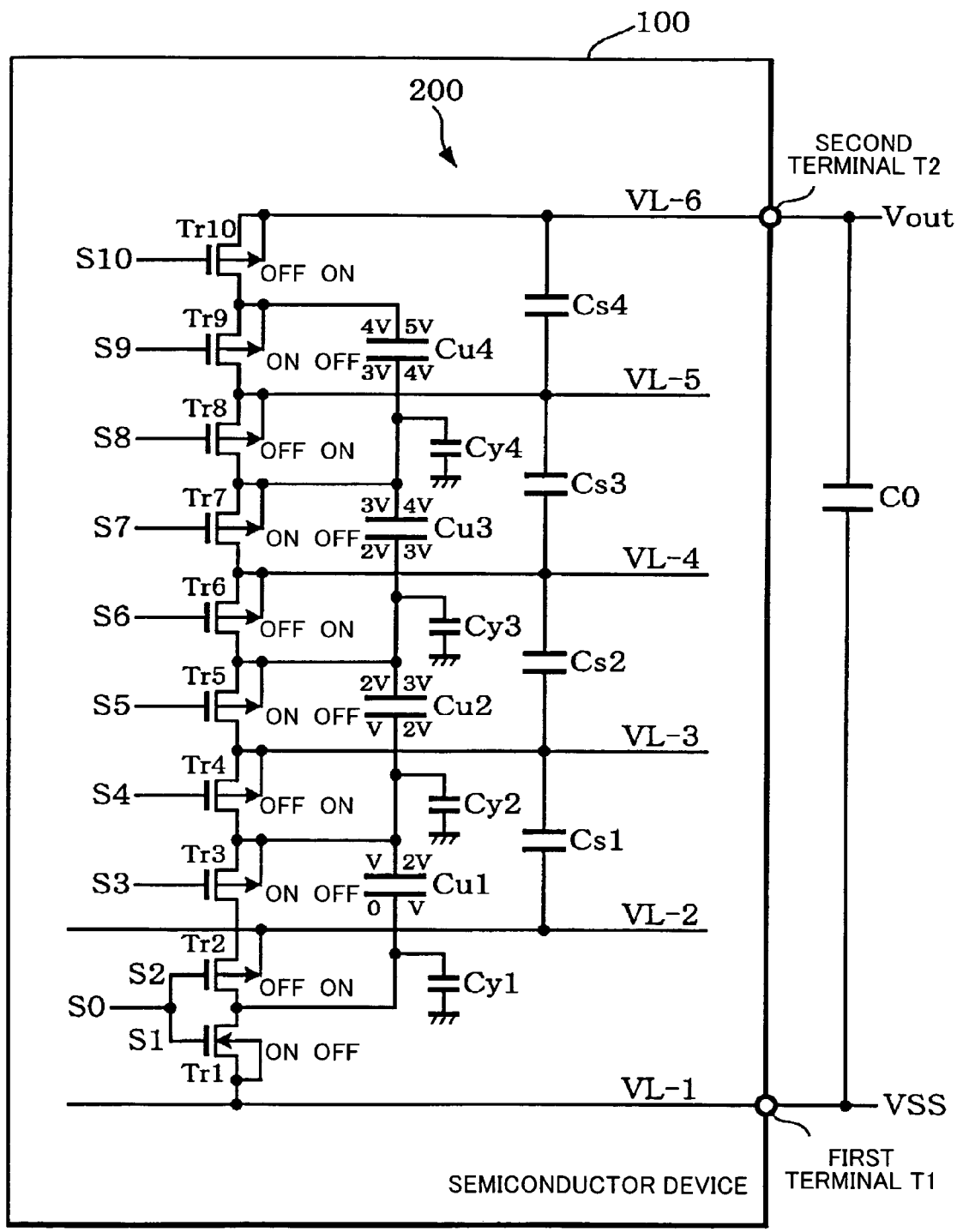
FIG. 6 is a diagram schematically showing the configuration of a semiconductor device including the charge-pump circuit according to one embodiment of the present invention.

FIG. 6 schematically shows the configuration of a semiconductor device including the charge-pump circuit shown in FIG. 3. In FIG. 6, components that are the same as those in FIG. 3 are denoted by the same reference numbers and further description thereof is omitted.

A semiconductor device 100 (integrated circuit device (IC) or chip) includes a charge-pump circuit 200 shown in FIG. 3. Specifically, the semiconductor device 100 includes first to 2Nth switching elements (N is an integer larger than 2), one end of the first switching element being connected with the first power supply line, one end of the 2Nth switching element being connected with the (N+1)th power supply line, and the remaining switching elements excluding the first and 2Nth switching elements being connected in series between the other end of the first switching element and the other end of the 2Nth switching element, first to (N−1)th boost capacitors, one end of each of the boost capacitors being connected with a jth connection node ($1 \leq j \leq 2N-3$, j is an odd number) to which the jth and (j+1)th switching elements are connected, and the other end of the boost capacitor being connected with a (j+2)th connection node to which the (j+2)th and (j+3)th switching elements are connected, and first to (N−2)th stabilization capacitors, one end of each of the stabilization capacitors being connected with a kth connection node ($2 \leq k \leq 2N-4$, k is an even number) to which the kth and (k+1)th switching elements are connected, and the other end of the stabilization capacitor being connected with a (k+2)th connection node to which the (k+2)th and (k+3)th switching elements are connected. In the semiconductor device 100, the switching elements are controlled so that one of the mth switching element ($1 \leq m \leq 2N-1$, m is an integer) and the (m+1)th switching element is exclusively turned ON.

The charge-pump circuit 200 may further include an (N−1)th stabilization capacitor connected between the Nth power supply line and the (N+1)th power supply line, and the (N−1)th stabilization capacitor may store an electric charge discharged from the (N−1)th boost capacitor in the second period.

FIG. 6 shows the configuration of the charge-pump circuit 200 when N is five (when the voltage is multiplied five times). The fourth stabilization capacitor Cs4 corresponding to the (N−1)th stabilization capacitor Cs(N−1) is connected between the fifth and sixth power supply lines VL-5 and VL-6.

The semiconductor device 100 includes the boost capacitors and the stabilization capacitors of the charge-pump circuit 200. In FIG. 6, the semiconductor device 100 includes the first to fourth boost capacitors Cu1 to Cu4 and the first to fourth stabilization capacitors Cs1 to Cs4 of the charge-pump circuit 200.

Only a capacitor for stabilizing the boosted voltage is provided outside the semiconductor device 100. In more detail, the semiconductor device 100 includes first and second terminals T1 and T2 which are electrically connected with the first and (N+1)th power supply lines VL-1 and VL-(N+1), respectively, and the capacitor C0 is connected between the first and second terminals T1 and T2 outside the semiconductor device 100. In FIG. 6, the semiconductor device 100 includes the first and second terminals T1 and T2 electrically connected with the first and sixth power supply lines VL-1 and VL-6, respectively, and the capacitor C0 is connected between the first and second terminals T1 and T2 outside the semiconductor device 100.

The switching element of the charge-pump circuit 200 is formed by a metal-oxide semiconductor (MOS) transistor. In more detail, the first switching element SW1 is formed by an n-channel MOS transistor Tr1. The second to tenth switching elements SW2 to SW10 are formed by p-channel MOS transistors Tr2 to Tr10.

Figure 7:
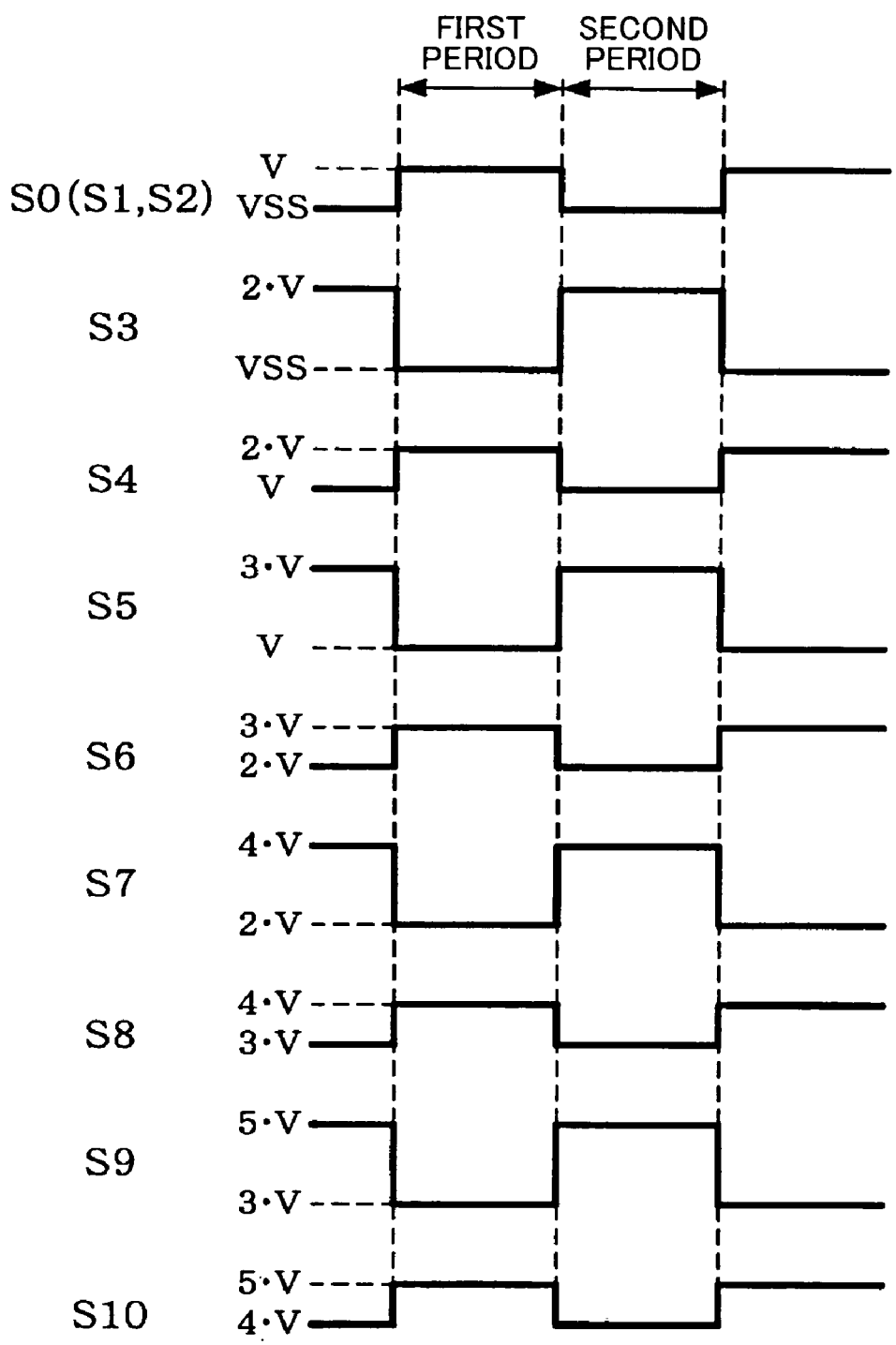
FIG. 7 is a timing chart schematically showing the operation of the switch control signals shown in FIG. 6.

Therefore, the switch control signals S1 to S10 which ON/OFF control the MOS transistors as the switching elements are generated at a timing shown in FIG. 7. A switch control signal S0 is used as the switch control signals S1 and S2 for the MOS transistors Tr1 and Tr2.

In FIG. 6, the conducting state of each MOS transistor in the first and second periods is indicated by "ON" or "OFF". The conducting state in the first period is shown on the left, and the conducting state in the second period is shown on the right.

FIG. 6 also shows the voltages applied to each boost capacitor in the first and second periods. The voltage applied in the first period is shown on the left, and the voltage applied in the second period is shown on the right.

The operation of the charge-pump circuit 200 is the same as described with reference to FIGS. 3, 4, 5A, and 5B. Therefore, description of the operation is omitted.

2.2 Output Impedance

The output impedance of the charge-pump circuit 200 is calculated below in order to describe the effects of the charge-pump circuit 200.

The output impedance Z of the charge-pump circuit 200 corresponds to a slope along which the voltage of the sixth power supply line VL-6 drops when a current I is flown from the sixth power supply line VL-6 to which the boosted output voltage Vout is supplied, as shown by the following equation (1).

$$Vout = I \cdot Z \tag{1}$$

The capability of the charge-pump circuit is expressed by using the output impedance of the charge-pump circuit. The smaller the value of the output impedance, the smaller the voltage drop when the current is flown by the load. Therefore, the smaller the value of the output impedance, the higher the capability (charge supply capability and load drive capability) of the charge-pump circuit, and the greater the value of the output impedance, the lower the capability of the charge-pump circuit. The capability of the charge-pump circuit is preferably higher.

The output impedance of the charge-pump circuit 200 is simply calculated as described below.

Figure 8A:
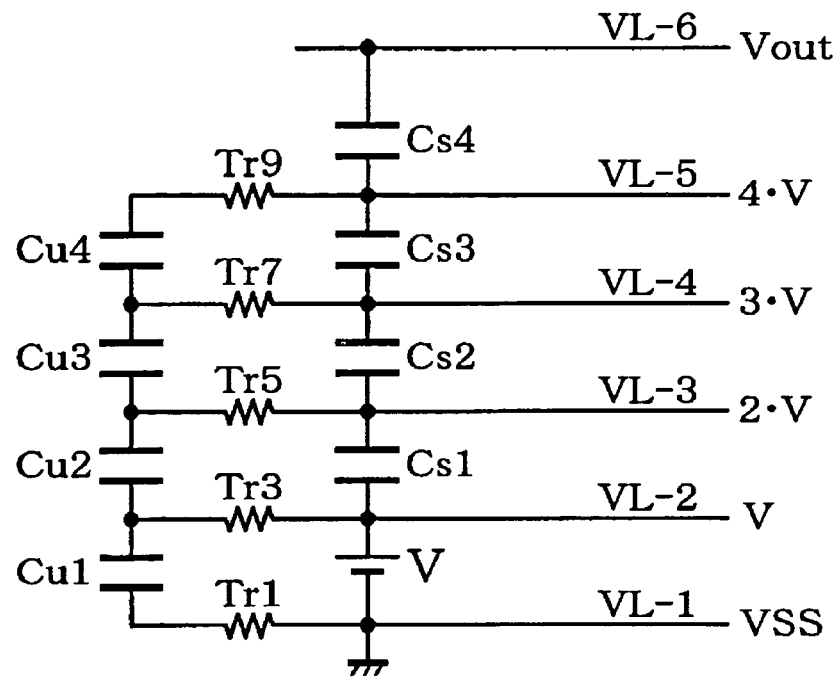
FIGS. 8A and 8B are equivalent circuit diagrams of the charge-pump circuit.
Figure 8B:
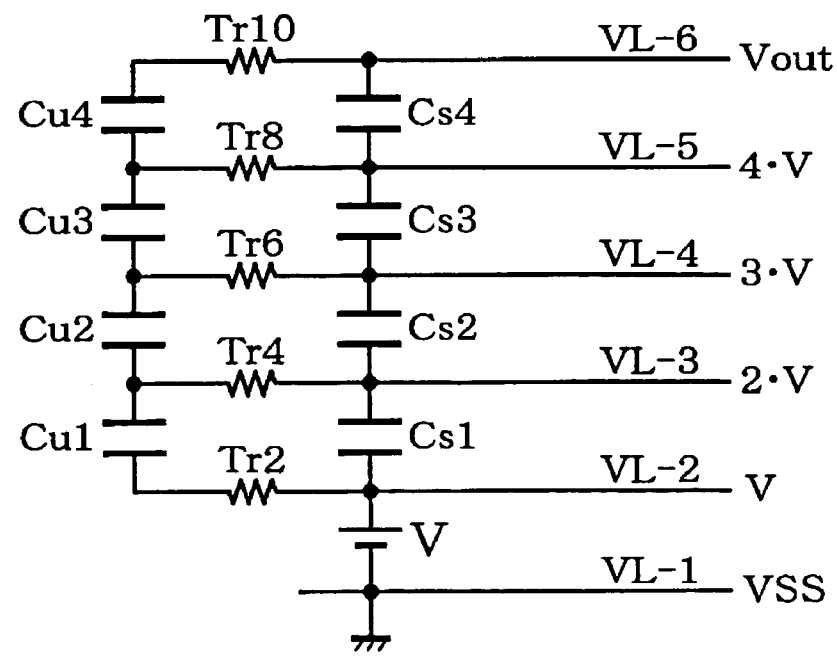

FIGS. 8A and 8B show equivalent circuits of the charge-pump circuit 200. FIG. 8A shows an equivalent circuit of the charge-pump circuit 200 in the first period. FIG. 8B shows an equivalent circuit of the charge-pump circuit 200 in the second period. A resistance element in each equivalent circuit shows the ON resistance of the MOS transistor. A power supply in each equivalent circuit shows that the voltage V is applied between the first and second power supply lines VL-1 and VL-2.

Eight states of the charge-pump operation of the charge-pump circuit 200 are considered below using each equivalent circuit. The impedance in each state is then calculated.

FIGS. 9A, 9B, 9C, and 9D shows equivalent circuits showing first four states of charge-pump operation of the charge-pump circuit 200.

FIGS. 10A, 10B, 10C, and 10D shows equivalent circuits showing second four states of charge-pump operation of the charge-pump circuit 200.

Figure 9A:
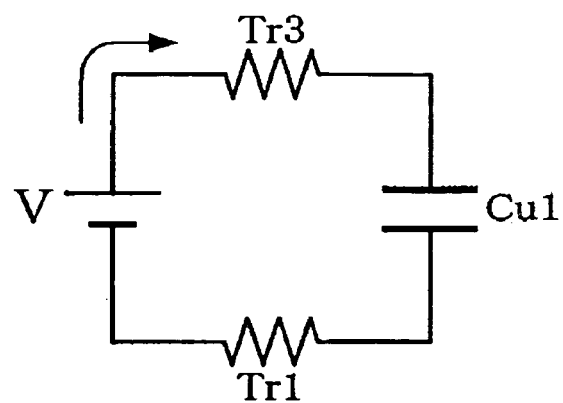
FIGS. 9A, 9B, 9C, and 9D are equivalent circuit diagrams showing first four states of charge-pump operation of the charge-pump circuit.
Figure 9B:
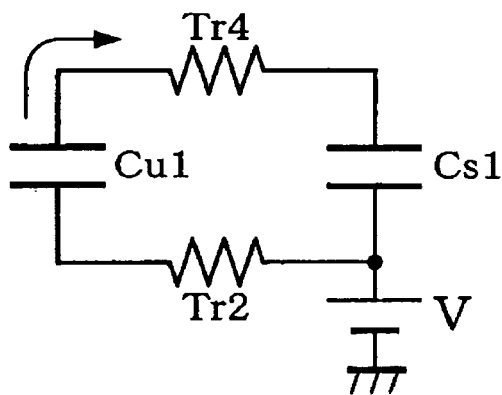
Figure 9C:
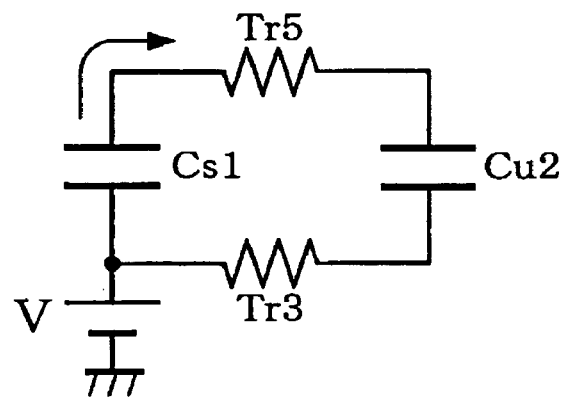
Figure 9D:
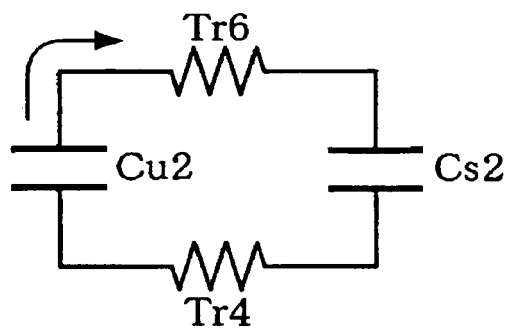

FIG. 9A is an equivalent circuit in which the MOS transistors Tr1 and Tr3 are turned ON. FIG. 9B is an equivalent circuit in which the MOS transistors Tr2 and Tr4 are turned ON. FIG. 9C is an equivalent circuit in which the MOS transistors Tr3 and Tr5 are turned ON. FIG. 9D is an equivalent circuit in which the MOS transistors Tr4 and Tr6 are turned ON.

Figure 10A:
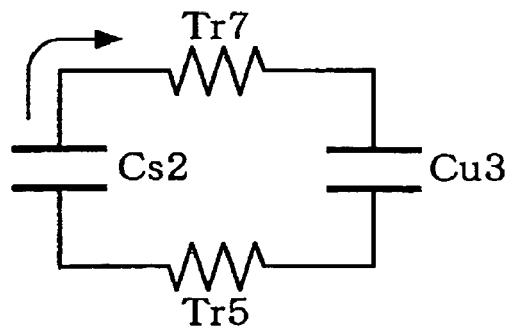
FIGS. 10A, 10B, 10C, and 10D are equivalent circuit diagrams showing second four states of charge-pump operation of the charge-pump circuit.
Figure 10B:
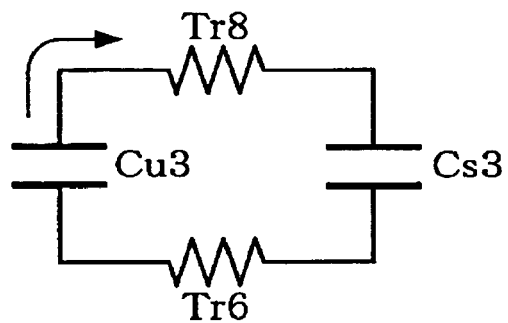
Figure 10C:
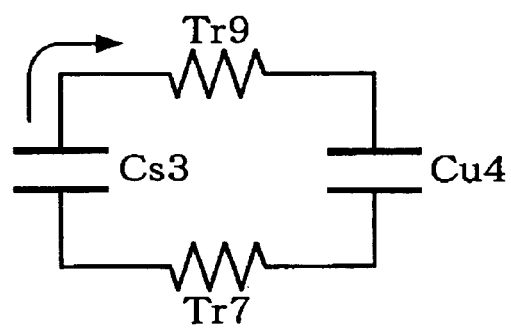
Figure 10D:
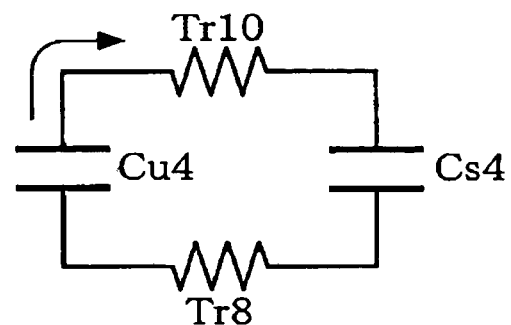

FIG. 10A is an equivalent circuit in which the MOS transistors Tr5 and Tr7 are turned ON. FIG. 10B is an equivalent circuit in which the MOS transistors Tr6 and Tr8 are turned ON. FIG. 10C is an equivalent circuit in which the MOS transistors Tr7 and Tr9 are turned ON. FIG. 10D is an equivalent circuit in which the MOS transistors Tr8 and Tr10 are turned ON.

The value of the ON resistance of each MOS transistor is denoted by r. The impedance is divided into a DC component and an AC component in each state shown in FIGS. 9A, 9B, 9C, 9D, 10A, 10B, 10C, and 10D.

The DC component of the impedance in each state is made up of the ON resistance of two MOS transistors. Therefore, the DC component is 2r.

The current i which flows in each state is calculated as shown by "i=cfV". f stands for the switching frequency. Since the AC component of the impedance occurs by switching between each state, the AC component is expressed by $1/(c \cdot f)$. Specifically, the AC component of the impedance becomes $1/(Cu1 \cdot f)$ by switching from the state shown in FIG. 9A to the state shown in FIG. 9B.

The AC component of the impedance becomes $1/(Cs1 \cdot f)$ by switching from the state shown in FIG. 9B to the state shown in FIG. 9C. The AC component of the impedance becomes $1/(Cu2 \cdot f)$ by switching from the state shown in FIG. 9C to the state shown in FIG. 9D. The AC component of the impedance becomes $1/(Cs2 \cdot f)$ by switching from the state shown in FIG. 9D to the state shown in FIG. 10A. The AC component of the impedance becomes $1/(Cu3 \cdot f)$ by switching from the state shown in FIG. 10A to the state shown in FIG. 10B. The AC component of the impedance becomes $1/(Cs3 \cdot f)$ by switching from the state shown in FIG. 10B to the state shown in FIG. 10C. The AC component of the impedance becomes $1/(Cu4 \cdot f)$ by switching from the state shown in FIG. 10C to the state shown in FIG. 10D.

The capacitance of each boost capacitor and each stabilization capacitor is denoted by c. Since the output impedance Z is the sum of the DC component and the AC component of the impedance, the output impedance Z is expressed by the following equation (2).

$$Z = 8 \times 2r + 7 \times 1/(c \cdot f) = 16r + 7/(c \cdot f) \quad (2)$$

When the voltage is multiplied N times, the general equation of the output impedance is expressed by the following equation (3).

$$Z = \{(2N-4) \times 2 + 4\} \times r + (2N-3)/(c \cdot f) \quad (3)$$
$$= (4N-4)r + (2N-3)/(c \cdot f)$$

2.3 Comparative Example

A comparative example of a charge-pump circuit is described below for comparison with the charge-pump circuit 200 shown in FIG. 6.

Figure 11:
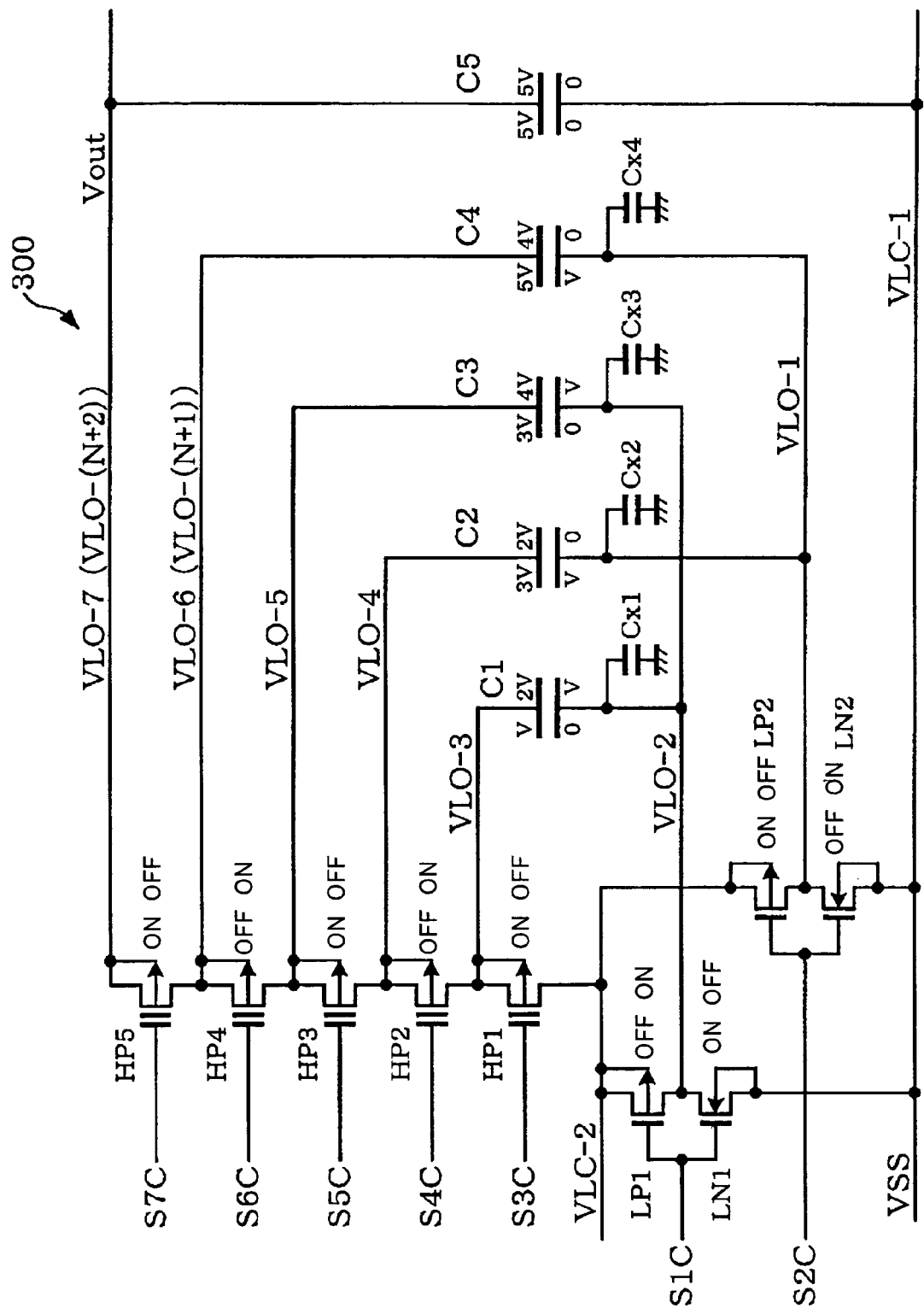
FIG. 11 is a diagram showing the configuration of a charge-pump circuit in a comparative example.

FIG. 11 is a diagram showing the configuration of a charge-pump circuit in the comparative example. In FIG. 11, components that are the same as those of the charge-pump circuit 200 shown in FIG. 6 are denoted by the same reference numbers.

A charge-pump circuit 300 in the comparative example includes first and second power supply lines VLC-1 and VLC-2, and first to (N+2)th output power supply lines VLO-1 to VLO-(N+2). The charge-pump circuit 300 outputs a boosted voltage N×V obtained by multiplying the voltage V between the first and second power supply lines VLC-1 and VLC-2 N times to the (N+2)th output power supply line VLO-(N+2) as the output voltage Vout.

The charge-pump circuit 300 includes n-channel MOS transistors LN1 and LN2 and p-channel MOS transistors LP1 and LP2 as first to fourth low-voltage switching elements. The charge-pump circuit 300 includes p-channel MOS transistors HP1 to HPN as first to Nth high-voltage resistant switching elements.

The MOS transistors LP1 and LN1 are connected in series between the first and second power supply lines VLC-1 and VLC-2. The MOS transistors LP1 and LN1 are ON/OFF controlled by a switch control signal SIC. The MOS transistors LP2 and LN2 are connected in series between the first and second power supply lines VLC-1 and VLC-2. The MOS transistors LP2 and LN2 are ON/OFF controlled by the switch control signal S2C.

The MOS transistors HP1 to HPN are connected in series between the second power supply line VLC-2 and the (N+2)th output power supply line VLO-(N+2). A drain terminal of the MOS transistor HP1 is connected with the second power supply line VLC-2. A source terminal of the MOS transistor HPN is connected with the (N+2)th output power supply line VLO-(N+2). The MOS transistors HP1 to HPN are ON/OFF controlled by switch control signals S3C to S(N+2)C.

The first output power supply line VLO-1 is connected with a drain terminal of the MOS transistor LN2 and a drain terminal of the MOS transistor LP2. The second output power supply line VLO-2 is connected with a drain terminal of the MOS transistor LN1 and a drain terminal of the MOS transistor LP1.

In the case where N is an odd number, a flying capacitor is connected between the second output power supply line VLO-2 and the MOS transistor HPq ($1 \leq q \leq N$, q is an even number). Therefore, (N−1)/2 flying capacitors are connected with the second output power supply line VLO-2. A flying capacitor is connected between the first output power supply line VLO-1 and the MOS transistor HPt ($2 \leq t \leq N$, t is an odd number). Therefore, (N−1)/2 flying capacitors are connected with the first output power supply line VLO-1.

In the case where N is an even number, a flying capacitor is connected between the second output power supply line VLO-2 and the MOS transistor HPq ($1 \leq q \leq N$, q is an even number). Therefore, N/2 flying capacitors are connected with the second output power supply line VLO-2. A flying capacitor is connected between the first output power supply line VLO-1 and the MOS transistor HPt ($2 \leq t \leq N$, t is an odd number). Therefore, (N/2−1) flying capacitors are connected with the first output power supply line VLO-1.

FIG. 11 shows the configuration example when N is five (when a voltage is multiplied five times). A capacitor C5 is connected between the seventh output power supply line VLO-7 to which the output voltage Vout is output and the first power supply line VLC-1 in order to stabilize the output voltage Vout.

In FIG. 11, the conducting state of each MOS transistor in the first and second periods is indicated by "ON" or "OFF" in the same manner as in FIG. 6. The conducting state in the first period is shown on the left, and the conducting state in the second period is shown on the right.

FIG. 11 also shows the voltages applied to each flying capacitor in the first and second periods. The voltage applied in the first period is shown on the left, and the voltage applied in the second period is shown on the right.

Figure 12:
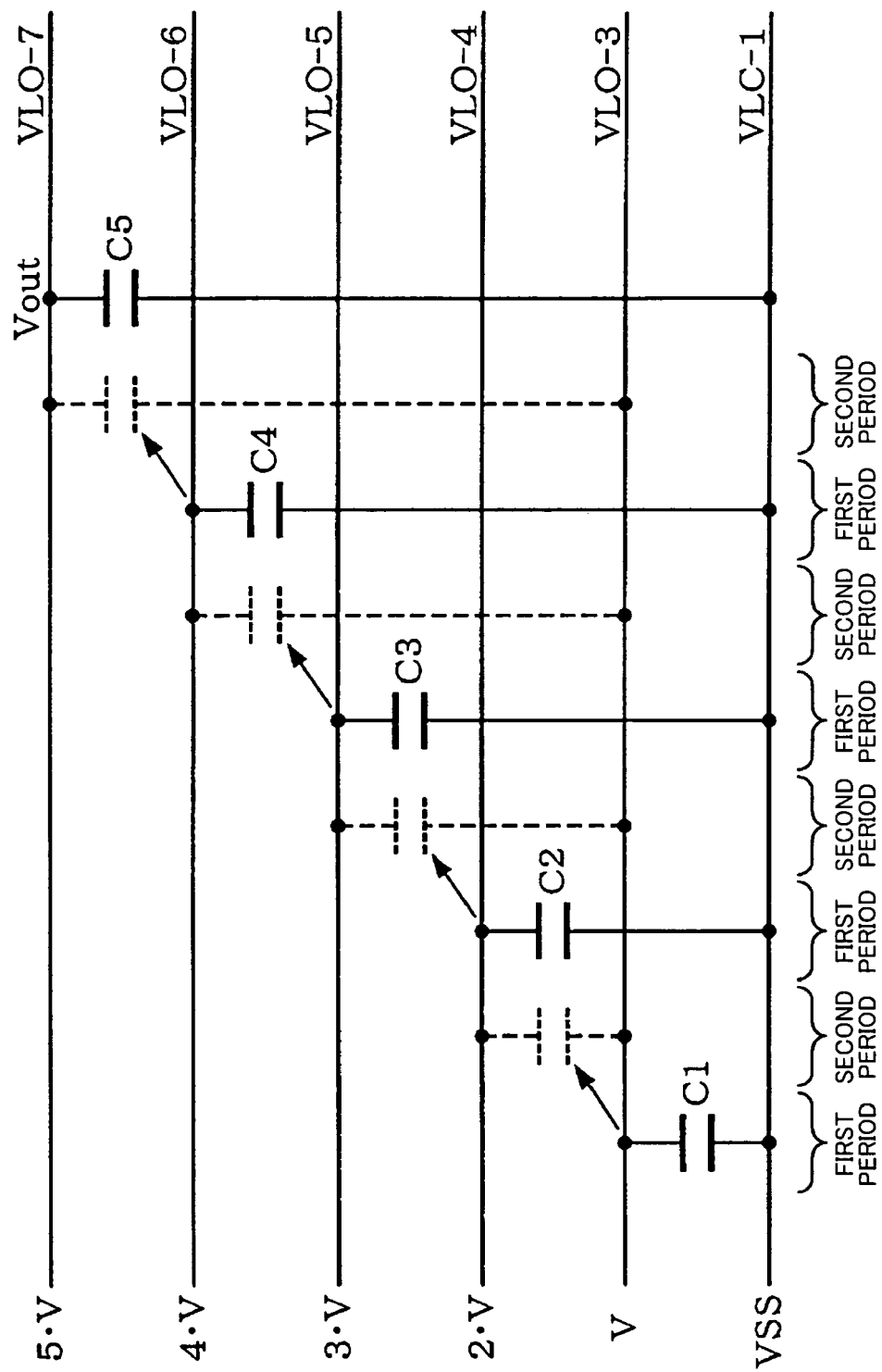
FIG. 12 is a diagram for illustrating the operation of the charge-pump circuit in the comparative example.

FIG. 12 is a diagram for illustrating the operation of the charge-pump circuit in the comparative example. As shown in this figure, a boosted voltage obtained by multiplying the voltage between the first and second power supply lines VLC-1 and VLC-2 N times is output to the (N+2)th output power supply line VLO-(N+2) (seventh output power supply line VLO-7 in FIG. 12) as the output voltage Vout by using the charge-pump method in which the first and second periods are repeated.

The output impedance of the charge-pump circuit 300 in the comparative example is simply calculated as described below.

Figure 13A:
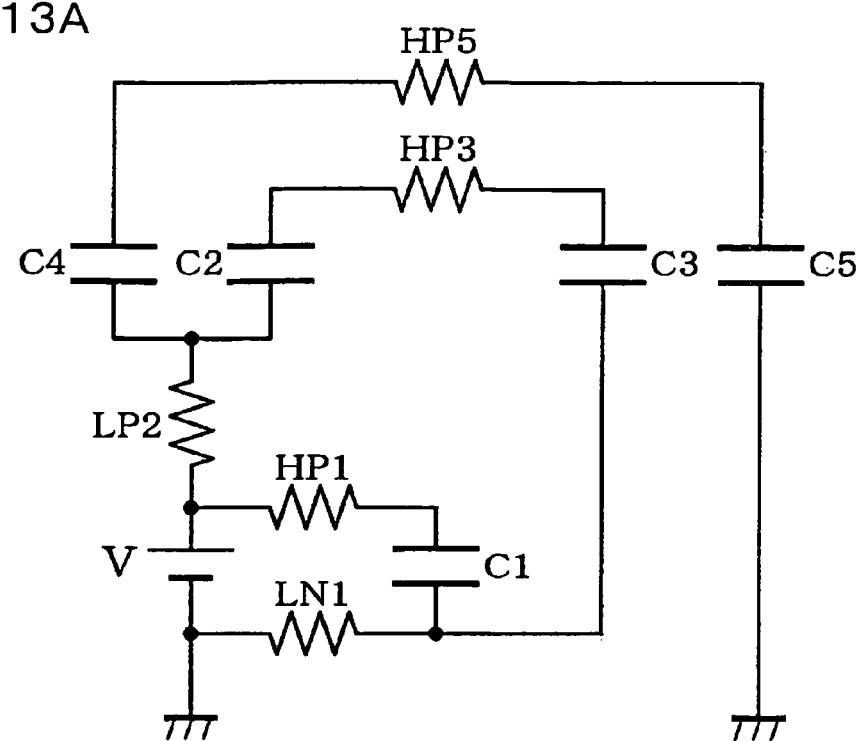
FIGS. 13A and 13B are equivalent circuit diagrams of the charge-pump circuit in the comparative example.
Figure 13B:
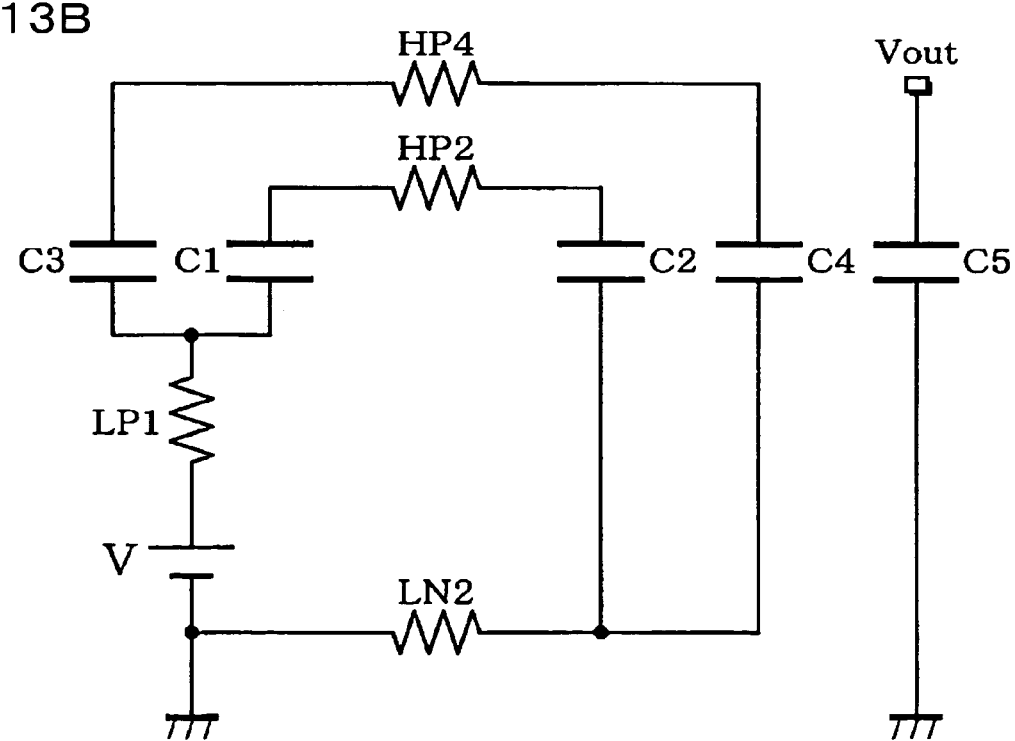

FIGS. 13A and 13B show equivalent circuits of the charge-pump circuit 300 in the comparative example. FIG. 13A shows an equivalent circuit of the charge-pump circuit 300 in the first period. FIG. 13B shows an equivalent circuit of the charge-pump circuit 300 in the second period. A resistance element in each equivalent circuit shows the ON resistance of the MOS transistor. A power supply in each equivalent circuit shows that the voltage V is applied between the first and second power supply lines VLC-1 and VLC-2.

Five states of the charge-pump operation of the charge-pump circuit 300 are considered below by using equivalent circuits. The impedance in each state is then calculated.

FIGS. 14A, 14B, 14C, 14D, and 14E show equivalent circuits of the five states of the charge-pump operation of the charge-pump circuit 300.

Figure 14A:
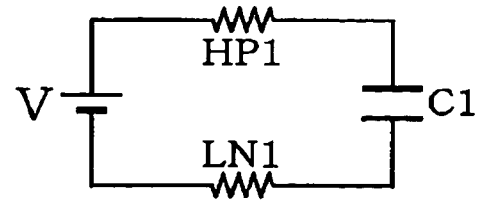
FIGS. 14A, 14B, 14C, 14D, and 14E are equivalent circuit diagrams showing five states of charge-pump operation of the charge-pump circuit in the comparative example.
Figure 14B:
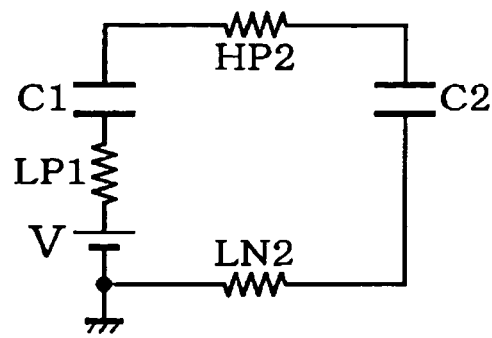
Figure 14C:
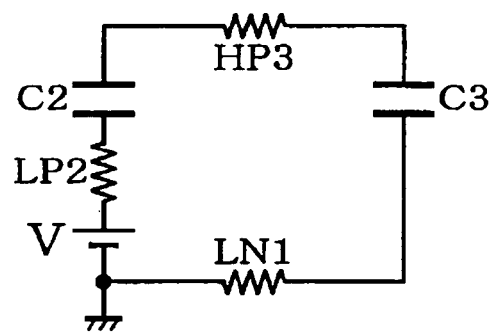
Figure 14D:
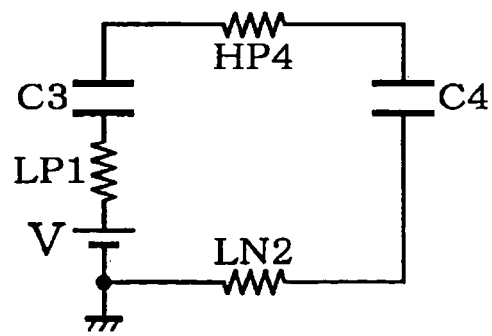
Figure 14E:
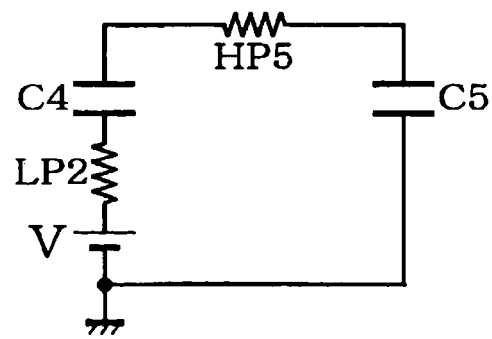

FIG. 14A is an equivalent circuit in which the MOS transistors HP1 and LN1 are turned ON. FIG. 14B is an equivalent circuit in which the MOS transistors HP2 and LN2 are turned ON. FIG. 14C is an equivalent circuit in which the MOS transistors HP3 and LN1 are turned ON. FIG. 14D is an equivalent circuit in which the MOS transistors HP4 and LN2 are turned ON. FIG. 14E is an equivalent circuit in which the MOS transistors HP5 and LP2 are turned ON.

The value of the ON resistance of each MOS transistor is denoted by r. The impedance is divided into a DC component and an AC component in each state shown in FIGS. 14A, 14B, 14C, 14D, and 14E.

The DC component of the impedance in each state shown in FIGS. 14A and 14E is 2r. The DC component of the impedance in each state shown in FIGS. 14B, 14C, and 14D is 3r.

The AC component of the impedance is calculated in the same manner as described above. Specifically, the AC component of the impedance becomes $1/(C1 \cdot f)$ by switching from the state shown in FIG. 14A to the state shown in FIG. 14B. The AC component of the impedance becomes $1/(C2 \cdot f)$ by switching from the state shown in FIG. 14B to the state shown in FIG. 14C. The AC component of the impedance becomes $1/(C3 \cdot f)$ by switching from the state shown in FIG. 14C to the state shown in FIG. 14D. The AC component of the impedance becomes $1/(C4 \cdot f)$ by switching from the state shown in FIG. 14D to the state shown in FIG. 14E.

The capacitance of each flying capacitor is denoted by c. Since the output impedance Zc is the sum of the DC component and the AC component of the impedance, the output impedance Zc is expressed by the following equation (4). The AC component of the capacitor C5 also occurs by the load connected with the seventh output power supply line VLO-7. However, the capacitor C5 is provided as an external capacitor, and has a capacitance sufficiently greater than the capacitances of the flying capacitors C1 to C4. Therefore, the flying capacitors C1 to C4 become dominant as the impedance, and the AC component of the capacitor C5 can be ignored.

$$Zc=(2\times 2r+3\times 3r)+4\times 1/(c \cdot f)=13r+4/(c \cdot f) \qquad (4)$$

When the voltage is multiplied N times, the general equation of the output impedance is expressed by the following equation (5).

$$Zc = \{2\times 2r + (N-2)\times 3r\} + (N-1)/(c \cdot f) \qquad (5)$$
$$= (3N-2)r + (N-1)/(c \cdot f)$$

2.4 Comparison with Comparative Example

The configuration of the charge-pump circuit 200 in this embodiment shown in FIG. 6 is compared with the configuration of the charge-pump circuit 300 in the comparative example shown in FIG. 11. These circuits implement voltage boosting by multiplying a voltage five times. However, the number of capacitors and the number of switching elements are greater in the charge-pump circuit 200.

The output impedance Z of the charge-pump circuit 200 in this embodiment shown in FIG. 6 is compared with the output impedance Zc of the charge-pump circuit 300 in the comparative example shown in FIG. 11. As is clear from the equations (2) and (4), the output impedance Zc is smaller than the output impedance Z.

Therefore, it is generally advantageous to employ the charge-pump circuit 300 in the comparative example instead of the charge-pump circuit 200 in this embodiment.

However, in the case where the capacitors of the charge-pump circuit are provided in the semiconductor device, all the boost capacitors and stabilization capacitors of the charge-pump circuit 200 in this embodiment can be manufactured by a low-voltage manufacturing process. On the other hand, the MOS transistors HP1 to HP5 and the flying capacitors C2 to C4 of the charge-pump circuits 300 in the comparative example must be manufactured by a high-voltage resistant manufacturing process.

The low voltage used herein is determined by the design rule based on the voltage V (1.8 to 3.3 V, for example) between the first and second power supply lines VLC-1 and VLC-2 (VL-1 and VL-2). The high voltage used herein means a higher voltage determined by the design rule, and it is a voltage of 10 to 20 V, for example.

The film thickness between the electrodes of the capacitor formed in the semiconductor device differs depending on whether the low-voltage manufacturing process or the high-voltage resistant manufacturing process is used. The film thickness between the electrodes of the capacitor formed by the low-voltage manufacturing process can be further reduced, whereby the capacitance per unit area can be increased. Specifically, the area of the capacitor formed by the low-voltage manufacturing process can be made smaller than the area of the capacitor formed by the high-voltage resistant manufacturing process in order to obtain a certain capacitance. Moreover, the influence of an increase in the number of capacitors can be reduced assuming that the capacitors are provided in the semiconductor device.

Therefore, in the case of providing the capacitors in the same area of the semiconductor device, the charge-pump circuit 200 in this embodiment is more advantageous than the charge-pump circuit 300 in the comparative example.

The following advantages are obtained by providing the capacitors of the charge-pump circuit 200 in this embodiment in the semiconductor device.

Since the MOS transistor as the switching element can be manufactured by the low-voltage manufacturing process, the charge/discharge current due to the gate capacitance of the MOS transistor can be reduced. Since the channel width of the low-voltage MOS transistor can be reduced in comparison with a high-voltage MOS transistor which implements the same ON resistance, the charge/discharge voltage is low as shown in FIG. 6. On the contrary, the charge/discharge voltage in FIG. 11 is V to 5×V, and 5×V is a high voltage. Therefore, the charge/discharge current due to the gate capacitance can be reduced by employing the low-voltage MOS transistor, even if the gate capacitance is increased due to a decrease in the gate film thickness.

In the case of forming the capacitors in the same area of the semiconductor device (same cost) and obtaining the same output impedance (same capability) for the charge-pump circuit 200 in this embodiment and the charge-pump circuit 300 in the comparative example, current consumption accompanying switching can be reduced by the charge-pump circuit 200 in this embodiment in comparison with the charge-pump circuit 300 in the comparative example.

This advantage is described below. Since a sufficient time is necessary for charging the capacitor of the charge-pump circuit, the time constant $C \cdot r$ is sufficiently smaller than $\frac{1}{2}f$ (charge/discharge frequency). The time constant $C \cdot r$ is assumed to be one-tenth of the pulse of the switch control signal, for example. The capacitances of the capacitors of the charge-pump circuit 200 and the charge-pump circuit 300 are assumed to be the same, and the values of the ON resistance of the MOS transistors are assumed to be the same.

$$C \cdot r = 1/(20 \cdot f) \tag{6}$$

Therefore, substituting the equation (6) in the equations (2) and (4) yields the following equations (7) and (8).

$$Z = 13/(20 \cdot Ca \cdot fa) + 4/(Ca \cdot fa) \tag{7}$$

$$Zc = 16/(20 \cdot Cb \cdot fb) + 7/(Cb \cdot fb) \tag{8}$$

In the equations (7) and (8), Ca stands for the capacitance of one capacitor in the charge-pump circuit 300, and Cb stands for the capacitance of one capacitor in the charge-pump circuit 200. fa stands for the charge/discharge frequency of each capacitor in the charge-pump circuit 300, and fb stands for the charge/discharge frequency of each capacitor in the charge-pump circuit 200.

In order to equalize the output impedance Z of the charge-pump circuit 200 and the output impedance Zc of the charge-pump circuit 300, Z=Zc from the equations (7) and (8). Therefore, the following equation (9) is obtained.

$$Cb \cdot fb = (7.8/4.65) \cdot Ca \cdot fa = 1.68 \cdot Ca \cdot fa \tag{9}$$

The film thickness of an insulating oxide film when manufacturing a capacitor CLV by the low-voltage manufacturing process is 10 nm, and the film thickness of an insulating oxide film when manufacturing a capacitor CHV by the high-voltage resistant manufacturing process of 16 V is 55 nm, for example. In this case, the capacitance ratio per unit area is expressed by the following equation (10).

$$CLV = 5.5 \cdot CHV \tag{10}$$

In the charge-pump circuit 300 shown in FIG. 11, it is necessary that only the flying capacitor C1 is for a low voltage, and the flying capacitors C2 to C4 are resistant to a high voltage. Therefore, in order to equalize the capacitances of all the capacitors, the area of the capacitors is as follows when the entire area is S.

$$\text{Area of low-voltage capacitor: } 0.057 \cdot S \tag{11}$$

$$\text{Area of each high-voltage resistant capacitor: } 0.314 \cdot S \tag{12}$$

In the charge-pump circuit 200 shown in FIG. 6, since it suffices that all the eight boost capacitors and stabilization capacitors are for a low voltage, the area of the capacitors is as follows when the entire area is S.

$$\text{Area of low-voltage capacitor: } 0.125 \cdot S \tag{13}$$

Therefore, in order to implement the sum of the capacitance Ca of one capacitor of the charge-pump circuit 300 and the capacitance Cb of one capacitor of the charge-pump circuit 200 in the same area, the following relational equation is obtained.

$$Cb = (0.125/0.057) \cdot Ca = 2.19 \cdot Ca \tag{14}$$

The relationship between fb and fa is expressed by the following equation (15) by substituting the equation (14) in the equation (9).

$$fb = 0.77 \cdot fa \tag{15}$$

The equation (15) shows that the charge/discharge frequency fb of the charge-pump circuit 200 in this embodiment is 0.77 times the charge/discharge frequency fa of the charge-pump circuit 300 in the comparative example. Therefore, according to this embodiment, the charge/discharge frequency can be reduced. Specifically, current consumption accompanying switching of the switching element can be reduced due to reduction of the frequency of the switch control signal.

The third advantage obtained by providing the capacitors of the charge-pump circuit 200 in this embodiment in the semiconductor device is as follows.

Specifically, in the case of forming the capacitors in the same area of the semiconductor device (same cost) and obtaining the same output impedance (same capability) for the charge-pump circuit 200 in this embodiment and the charge-pump circuit 300 in the comparative example, the charge/discharge current due to the parasitic capacitance of the capacitor can be reduced by the charge-pump circuit 200 in this embodiment in comparison with the charge-pump circuit 300 in the comparative example.

Figure 15:
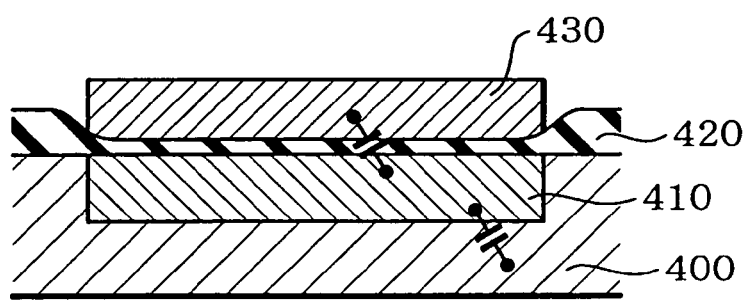
FIG. 15 is a diagram for illustrating a parasitic capacitance of a capacitor in a semiconductor device.

FIG. 15 is a diagram for illustrating the parasitic capacitance of the capacitor provided in the semiconductor device. In the case of providing the capacitor in the semiconductor device, an n-type well region 410 (impurity region in a broad sense) is formed in an a p-type silicon substrate 400 (semiconductor substrate in a broad sense) which makes up the semiconductor device. An insulating oxide film 420 (insulating layer in a broad sense) is formed on the n-type well region 410. A polysilicon film 430 (conductive layer in a broad sense) is formed on the insulating oxide film 420.

A capacitor is formed by the n-type well region 410, the insulating oxide film 420 and the polysilicon film 430. A junction capacitance between the p-type silicon substrate 400 and the n-type well region 410 becomes the parasitic capacitance.

In the charge-pump circuit 300 in the comparative example, a voltage $\Delta V$ is charged/discharged to or from all the capacitors C1 to C4 as the flying capacitors, as shown in FIG. 11. In FIG. 11, the parasitic capacitances of the capacitors C1 to C4 are denoted by Cx1 to Cx4. If the parasitic capacitance per unit area is Ci, the charge/discharge current Ia due to the parasitic capacitance is expressed by the following equation.

$$Ia = Ci \cdot S \cdot V \cdot fa \qquad (16)$$

In the charge-pump circuit 200 in this embodiment, the stabilization capacitors are not repeatedly charged/discharged, and only the boost capacitors are repeatedly charged/discharged. Therefore, the parasitic capacitances of four capacitors among the eight capacitors generate the charge/discharge current. In FIG. 6, the parasitic capacitances of the first to fourth boost capacitors Cu1 to Cu4 are denoted by Cy1 to Cy4. The charge and discharge current Ib by the parasitic capacitances Cy1 to Cy4 of the first to fourth boosting capacitors Cu1 to Cu4 is expressed by the following equation.

$$Ib = Ci \cdot (S/2) \cdot V \cdot fb \qquad (17)$$

The relationship between Ia and Ib is calculated from the equations (16) and (17), and substituting the equation (15) yields the following equation.

$$Ib = (Ia/2) \cdot 0.77 = 0.38 \cdot Ia \qquad (18)$$

The equation (18) shows that the charge/discharge current Ib of the parasitic capacitance of the capacitor of the charge-pump circuit 200 in this embodiment is 0.38 times the charge/discharge current Ia of the parasitic capacitance of the capacitor of the charge-pump circuit 300 in the comparative example. Therefore, according to this embodiment, the charge/discharge current due to the parasitic capacitance of the capacitor can be significantly reduced.

As described above, current consumption can be significantly reduced in comparison with the charge-pump circuit 300 in the comparative example by providing the capacitors in the configuration of this embodiment in the semiconductor device.

3. Configuration of Booster Circuit

The configuration of a booster circuit according to one embodiment of the present invention is described below in detail. The booster circuit in this embodiment includes two charge-pump circuits to which the above-described charge-pump circuit is applied.

Figure 16:
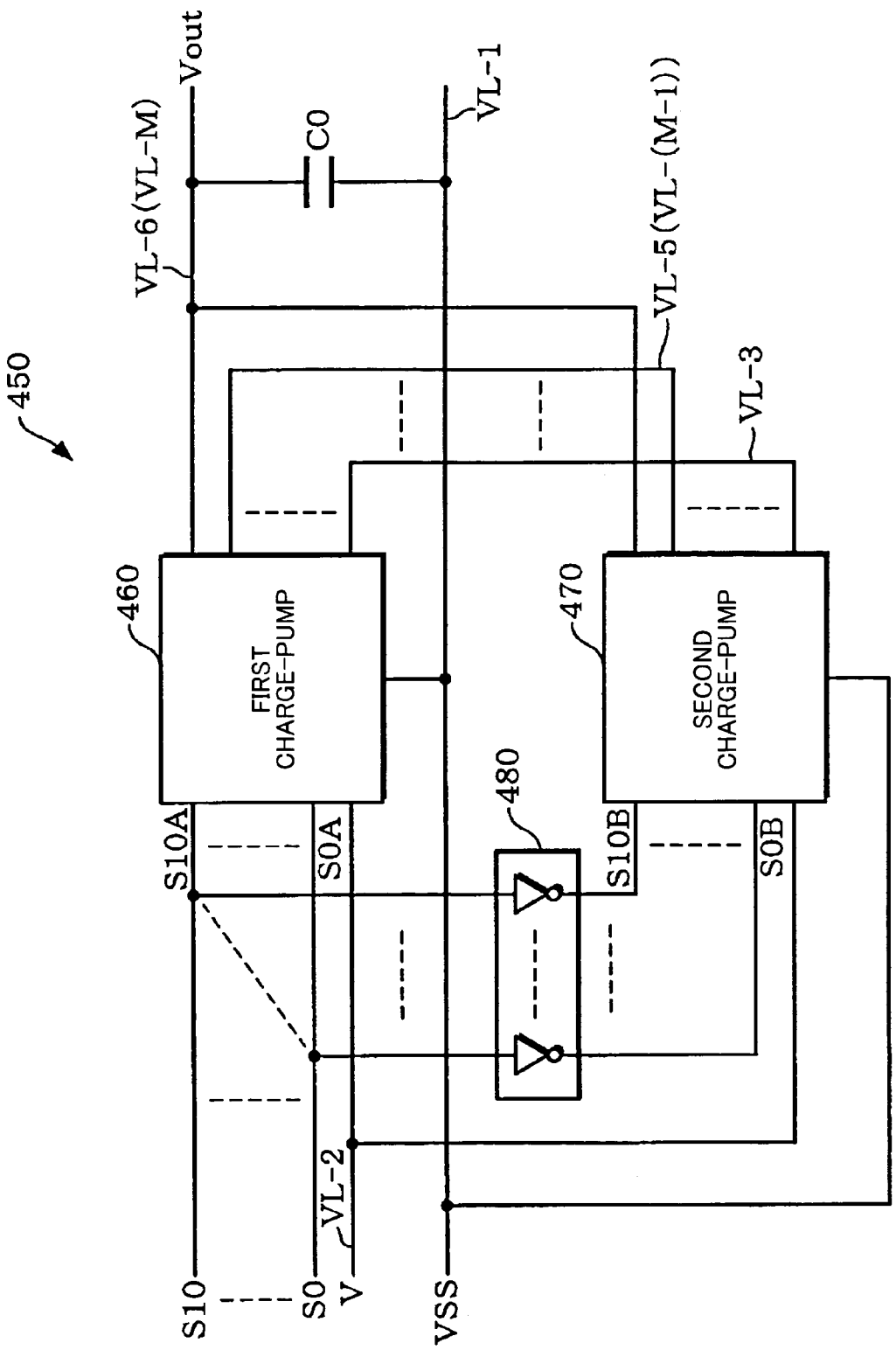
FIG. 16 is a block diagram schematically showing the booster circuit according to one embodiment of the present invention.

FIG. 16 is a diagram schematically showing the configuration of the booster circuit in this embodiment.

A booster circuit 450 in this embodiment includes first to Mth power supply lines VL-1 to VL-M (M is an integer larger than 3), and first and second charge-pump circuits 460 and 470. The charge-pump circuit shown in FIG. 2 is applied to the first and second charge-pump circuits 460 and 470. The booster circuit 450 is provided in a semiconductor device. FIG. 16 shows the configuration when M is six (when a voltage is multiplied five times).

Figure 17:
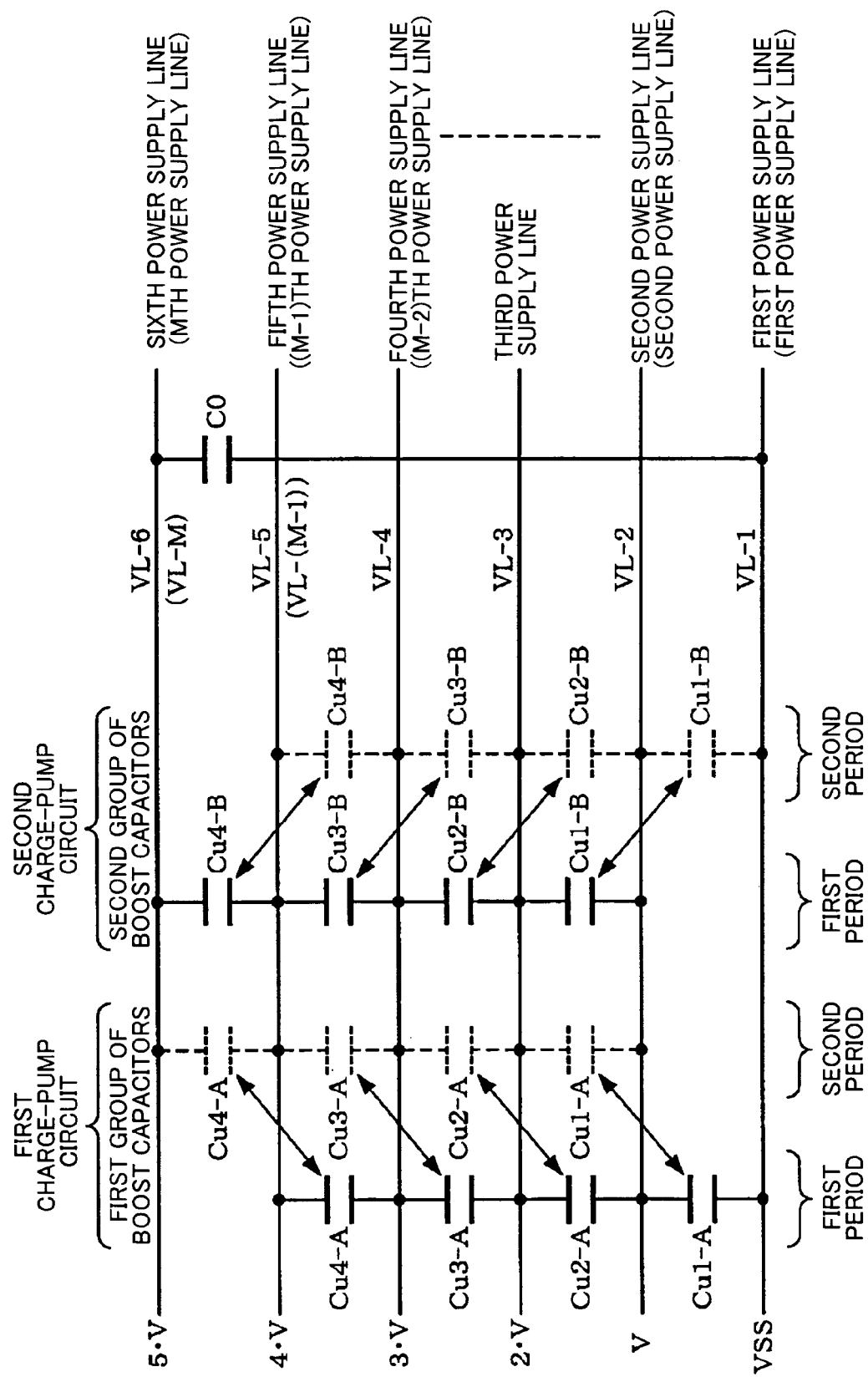
FIG. 17 is a diagram for illustrating the operation of the booster circuit according to one embodiment of the present invention.

FIG. 17 is a diagram for illustrating the operation of the booster circuit shown in FIG. 16. Each of the first and second charge-pump circuits 460 and 470 of the booster circuit 450 includes first to (M−2)th boost capacitors, the jth boost capacitor (1≦j≦M−2, j is an integer) being connected between the jth power supply line VL-j and the (j+1)th power supply line VL-(j+1) in the first period, and connected between the (j+1)th power supply line VL-(j+1) and the (j+2)th power supply line VL-(j+2) in the second period subsequent to the first period. The first to Mth power supply lines VL-1 to VL-M are common in the first and second charge-pump circuits 460 and 470.

The first and second charge-pump circuits 460 and 470 output a voltage obtained by multiplying the voltage between the first and second power supply lines VL-1 and VL-2(M−1) times between the first and Mth power supply lines VL-1 and VL-M in different phases.

In more detail, the first charge-pump circuit 460 includes a first group of first to (M−2)th boost capacitors Cu-1A to Cu-(M−2)A, the j1th boost capacitor (1≦j1≦M−2, j1 is an integer) being connected between the j1th power supply line and the (j1+1)th power supply line in the first period, and connected between the (j1+1)th power supply line and the (j1+2)th power supply line in the second period subsequent to the first period. The second charge-pump circuit 470 includes a second group of first to (M−2)th boost capacitors Cu-2A to Cu-(M−2)A, the j2th boost capacitor (1≦j2≦M−2, j2 is an integer) being connected between the j2th power supply line and the (j2+1)th power supply line in the second period, and connected between the (j2+1)th power supply line and the (j2+2)th power supply line in the first period. Therefore, voltage boosted by the second charge-pump circuit 470 is output between the first and Mth power supply lines VL-1 and VL-M in the first period. In the second period, voltage boosted by the first charge-pump circuit 460 is output between the first and Mth power supply lines VL-1 and VL-M.

In the booster circuit 450, in the case where the functions of the boosted voltage generation circuit 12 and the switching element SW shown in FIG. 1 are implemented by the first charge-pump circuit 460, the functions of the charge hold circuit 14 and the charge supply circuit 16 shown in FIG. 1 are implemented by the second charge-pump circuit 470.

Therefore, the booster circuit 450 outputs the voltage boosted by the first charge-pump circuit 460 to the Mth power supply line VL-M in the first period, and outputs the voltage boosted by the second charge-pump circuit 470 to the Mth power supply line VL-M in the second period. Therefore, a voltage drop caused by the load connected with the Mth power supply line VL-M can be prevented by alternately repeating the first and second periods.

Since the non-output period of one charge-pump circuit is the output period of the other charge-pump circuit, a configuration in which the stabilization capacitor shown in FIG. 2 is omitted can be employed for each of the first and second charge-pump circuits 460 and 470.

Figure 18:
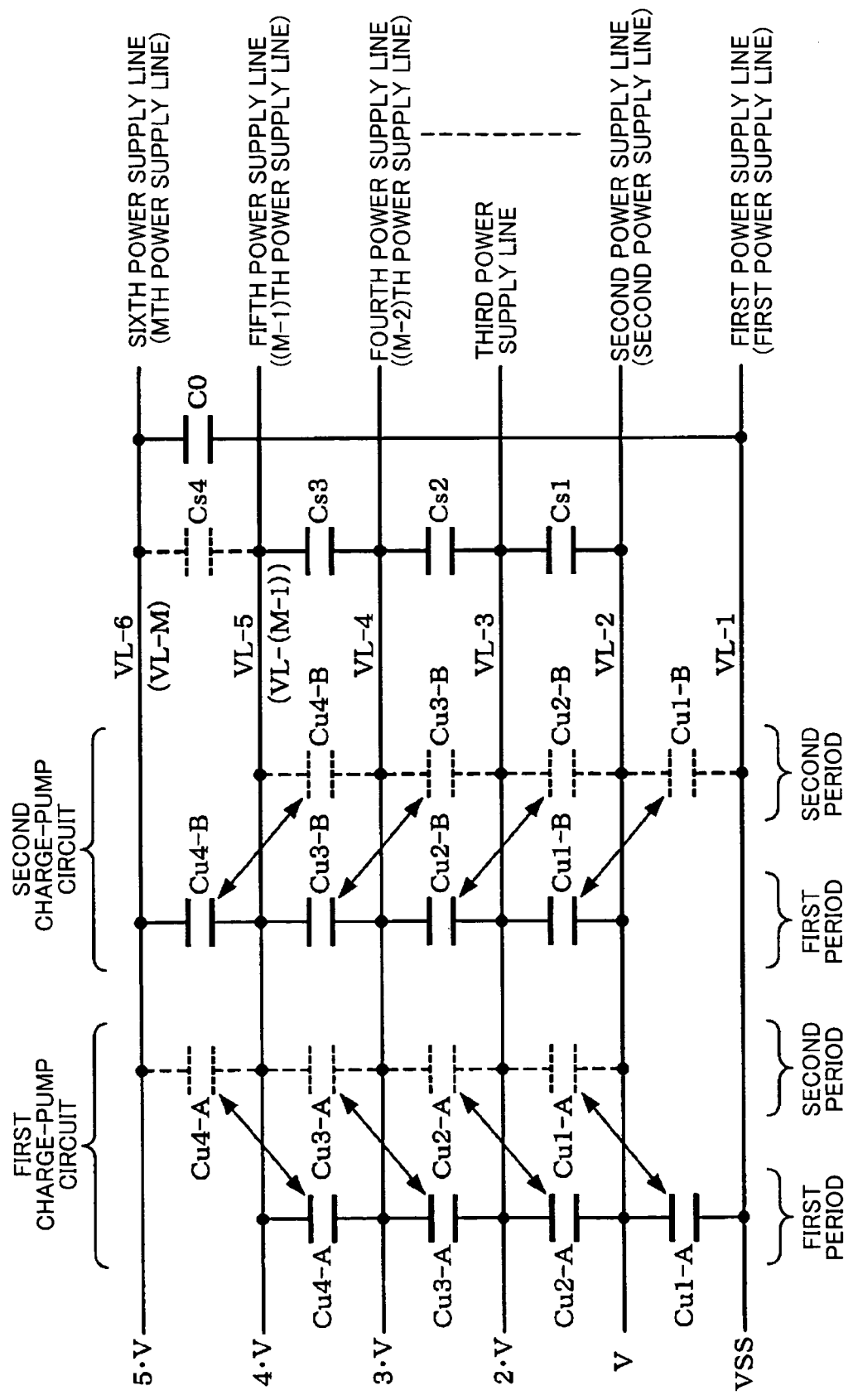
FIG. 18 is a diagram for illustrating the operation of another booster circuit according to one embodiment of the present invention.

As shown in FIG. 18, first to (M−3)th stabilization capacitors may be provided in order to stabilize the voltage of each power supply line. The kth stabilization capacitor Csk (1≦k≦M−3, k is an integer) among the first to (M−3)th stabilization capacitors is connected between the (k+1)th power supply line VL-(k+1) and the (k+2)th power supply line VL-(k+2). An (M−2)th stabilization capacitor Cs(M−2) connected between the (M−1)th power supply line VL-(M−1) and the Mth power supply line VL-M may be further provided.

FIG. 18 shows the configuration when M is six. The first stabilization capacitor Cs1 is connected between the second power supply line VL-2 and the third power supply line VL-3. The second stabilization capacitor Cs2 is connected between the third power supply line VL-3 and the fourth power supply line VL-4. The third stabilization capacitor Cs3 is connected between the fourth power supply line VL-4 and the fifth power supply line VL-5. The fourth stabilization capacitor Cs4 is connected between the fifth power supply line VL-5 and the sixth power supply line VL-6 as the (M−2)th stabilization capacitor Cs(M−2).

In FIGS. 16 to 18, a large-capacity capacitor C0 is connected for stabilization between the first and Mth power supply lines VL-1 and VL-M.

Although FIGS. 16 to 18 show the configuration in which a voltage is multiplied five times, the present invention is not limited thereto. The same configuration may be employed when a voltage is multiplied (M−1) times.

A reduction of current consumption and cost and stabilization of the output voltage can be achieved in the case of providing the booster circuit 450 in the semiconductor device by applying the charge-pump circuit which performs the charge-pump operation shown in FIG. 2 to the booster circuit 450.

The charge-pump circuit shown in FIG. 3 may be applied to each of the first and second charge-pump circuits 460 and 470.

In this case, when N is five in FIG. 16, the first charge-pump circuit 460 outputs a voltage obtained by boosting the voltage between the first and second power supply lines VL-1 and VL-2 to the sixth power supply line VL-6 by the charge-pump operation based on the switch control signals S0A to S10A. The second charge-pump circuit 470 outputs a voltage obtained by boosting the voltage between the first and second power supply lines VL-1 and VL-2 by the charge-pump operation based on the switch control signals S0B to S10B to the sixth power supply line VL-6.

The switch control signals S0A to S10A are signals generated at the same timing as the switch control signals S0 to S10 shown in FIG. 7. The switch control signals S0B to S10B are signals obtained by inverting the switch control signals S0A to S10A by using an inversion circuit 480. Therefore, the first and second charge-pump circuits 460 and 470 perform the charge-pump operation in different phases, and output the boosted voltage to the sixth power supply line VL-6.

Figure 19:
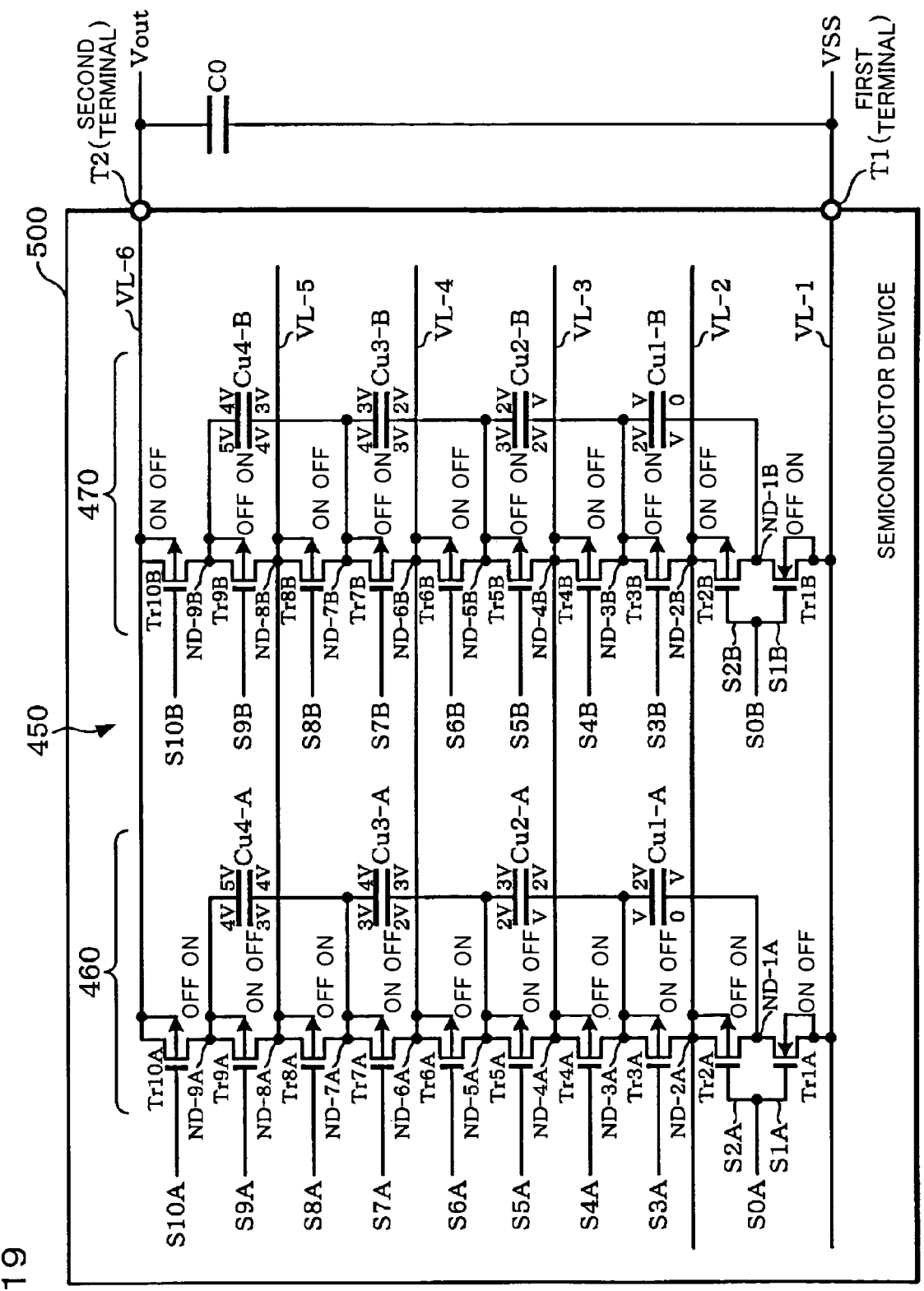
FIG. 19 is a diagram showing the configuration of a semiconductor device according to one embodiment of the present invention.

FIG. 19 is a diagram schematically showing the configuration of a semiconductor device including a booster circuit in which the charge-pump circuit shown in FIG. 3 is applied to each charge-pump circuit. In FIG. 19, components that are the same as those in FIG. 3 are denoted by the same reference numbers and further description thereof is omitted. "A" is attached to the end of symbols of the constituent elements of the first charge-pump circuit 460, and "B" is attached to the end of symbols of the constituent elements of the second charge-pump circuit 470.

The semiconductor device 500 includes the booster circuit 450. The booster circuit 450 includes the first to (N+1)th power supply lines (N is an integer larger than 2), and the first and second charge-pump circuits 460 and 470. Each charge-pump circuit includes first to 2Nth switching elements, one end of the first switching element being connected with the first power supply line, one end of the 2Nth switching element being connected with the (N+1)th power supply line, and the remaining switching elements excluding the first and 2Nth switching elements being connected in series between the other end of the first switching element and the other end of the 2Nth switching element, and first to (N−1)th boost capacitors, one end of each of the boost capacitors being connected with a jth connection node (1≦j≦2N−3, j is an odd number) to which the jth and (j+1)th switching elements are connected, and the other end of the boost capacitor being connected with a (j+2)th connection node to which the (j+2)th and (j+3)th switching elements are connected. In the semiconductor device 500, the first to (N+1)th power supply lines are common in the first and second charge-pump circuits 460 and 470. The switching elements are controlled so that one of the mth switching element (1≦m≦2N−1, m is an integer) and the (m+1)th switching element of each charge-pump circuit is exclusively turned ON, and the first to 2Nth switching elements of the first charge-pump circuit and the first to 2Nth switching elements of the second charge-pump circuit are ON/OFF controlled in different phases.

In more detail, the first charge-pump circuit 460 includes a first group of first to 2Nth switching elements, one end of the first switching element being connected with the first power supply line, one end of the 2Nth switching element being connected with the (N+1)th power supply line, and the remaining switching elements excluding the first and 2Nth switching elements being connected in series between the other end of the first switching element and the other end of the 2Nth switching element, and a first group of first to (N−1)th boost capacitors Cu-1A to Cu-(N−1)A, one end of each of the boost capacitors being connected with a j1th connection node (1≦j1≦2N−3, j1 is an odd number) to which the j1th and (j1+1)th switching elements are connected, and the other end of the boost capacitor being connected with a (j1+2)th connection node to which the (j1+2)th and (j1+3)th switching elements are connected. The switching elements are controlled so that one of the m1th switching element (1≦m1≦2N−1, m1 is an integer) and the (m1+1)th switching element in the first group is exclusively turned ON. The second charge-pump circuit 470 includes a second group of first to 2Nth switching elements, one end of the first switching element being connected with the first power supply line, one end of the 2Nth switching element being connected with the (N+1)th power supply line, and the remaining switching elements excluding the first and 2Nth switching elements being connected in series between the other end of the first switching element and the other end of the 2Nth switching element, and a second group of first to (N−1)th boost capacitors Cu-1B to Cu-(N−1)B, one end of each of the boost capacitors being connected with a j2th connection node (1≦j2≦2N−3, j2 is an odd number) to which the j2th and (j2+1)th switching elements are connected, and the other end of the boost capacitor being connected with a (j2+2)th connection node to which the (j2+2)th and (j2+3)th switching elements are connected. The switching elements are controlled so that one of the m2th switching element (1≦m2≦2N−1, m2 is an integer) and the (m2+1)th switching element in the second group is exclusively turned ON.

In the first period, the switching elements are controlled so that the mth switching element (1≦m≦2N, m is an integer) in the first group is turned ON and the mth switching element in the second group is turned OFF. In the second period subsequent to the first period, the switching elements are controlled so that the mth switching element in the first group is turned OFF and the mth switching element in the second group is turned ON.

FIG. 19 shows the configuration of the booster circuit 450 when N is five (when a voltage is multiplied five times). In the semiconductor device 500, only a capacitor for stabilizing the boosted voltage is provided outside the semiconductor device 500. In more detail, the semiconductor device 500 includes first and second terminals T1 and T2 which are electrically connected with the first and (N+1)th power supply lines VL-1 and VL-(N+1), respectively, and the capacitor C0 is connected between the first and second terminals T1 and T2 outside the semiconductor device 500. FIG. 19 shows the configuration when N is five. In FIG. 19, the semiconductor device 500 includes the first and second terminals T1 and T2 electrically connected with the first and sixth power supply lines VL-1 and VL-6, respectively, and the capacitor C0 is connected between the first and second terminals T1 and T2 outside the semiconductor device 500.

The semiconductor device 500 includes the boost capacitors of each charge-pump circuit. In FIG. 19, the first to fourth boost capacitors (Cu1-A to Cu4-A and Cu1-B to Cu4-B) of each charge-pump circuit are provided in the semiconductor device 500.

The switching element of each charge-pump circuit is formed by a MOS transistor. In more detail, in the first charge-pump circuit 460, the first switching element SW1A is formed by an n-channel MOS transistor Tr1A. The second to tenth switching elements SW2A to SW10A are formed by p-channel MOS transistors Tr2A to Tr10A. In the second charge-pump circuit 440, the first switching element SW1B is formed by an n-channel MOS transistor Tr1B. The second to tenth switching elements SW2B to SW10B are formed by p-channel MOS transistors Tr2B to Tr10B.

Figure 20:
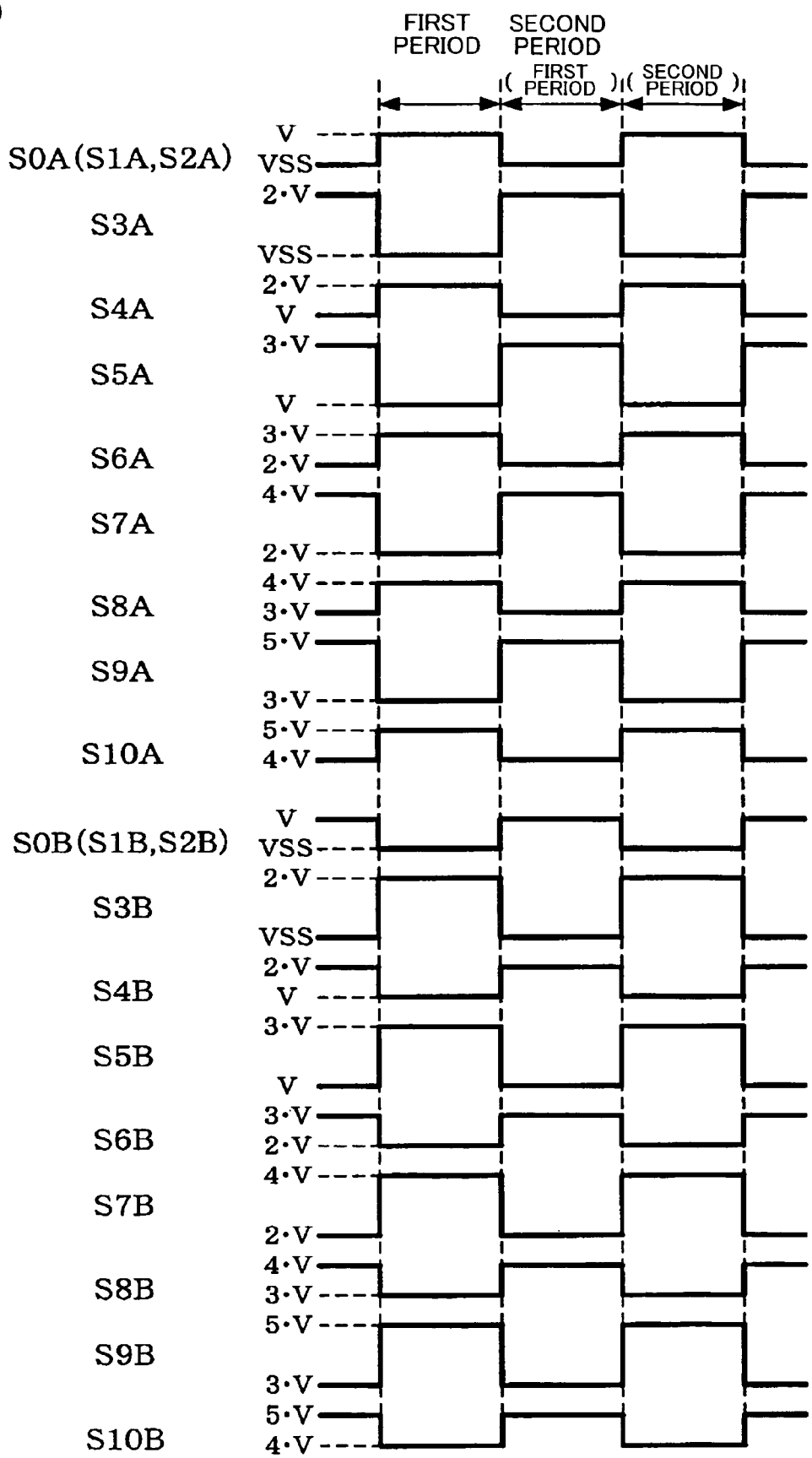
FIG. 20 is a timing chart schematically showing the operation of switch control signals shown in FIG. 19.

Therefore, the switch control signals S0A to S10A and S0B to S10B which ON/OFF control the MOS transistors as the switching elements are generated at a timing shown in FIG. 20. The inversion circuit 480 is omitted in FIG. 19. The inversion circuit 480 is included in the semiconductor device 500. Therefore, the switch control signals S0A to S10A and the switch control signals S0B to S10B are inverted in phase.

In FIG. 19, the function of the boosted voltage generation circuit 12 shown in FIG. 1 is implemented by the first charge-pump circuit 460. The functions of the charge hold circuit 14 and the charge supply circuit 16 shown in FIG. 1 are implemented by the second charge-pump circuit 470. In this case, the boost power supply line shown in FIG. 1 corresponds to a signal line at the same potential as the ninth connection node ND-9A. The switching element SW shown in FIG. 1 corresponds to the tenth switching element SW10A. The output power supply line shown in FIG. 1 corresponds to the sixth power supply line VL-6.

In FIG. 19, the conducting state of each MOS transistor in the first and second periods is indicated by "ON" or "OFF". The conducting state in the first period is shown on the left, and the conducting state in the second period is shown on the right.

FIG. 19 also shows the voltages applied to each boost capacitor in the first and second periods. The voltage applied in the first period is shown on the left, and the voltage applied in the second period is shown on the right.

Figure 21A:
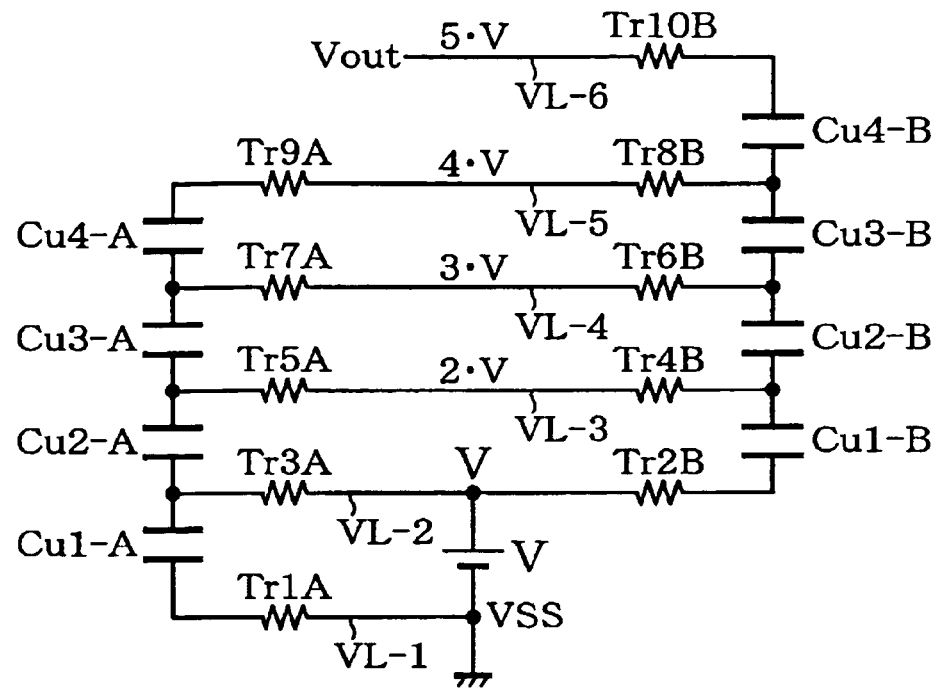
FIGS. 21A and 21B are equivalent circuit diagrams of the booster circuit shown in FIG. 19.
Figure 21B:
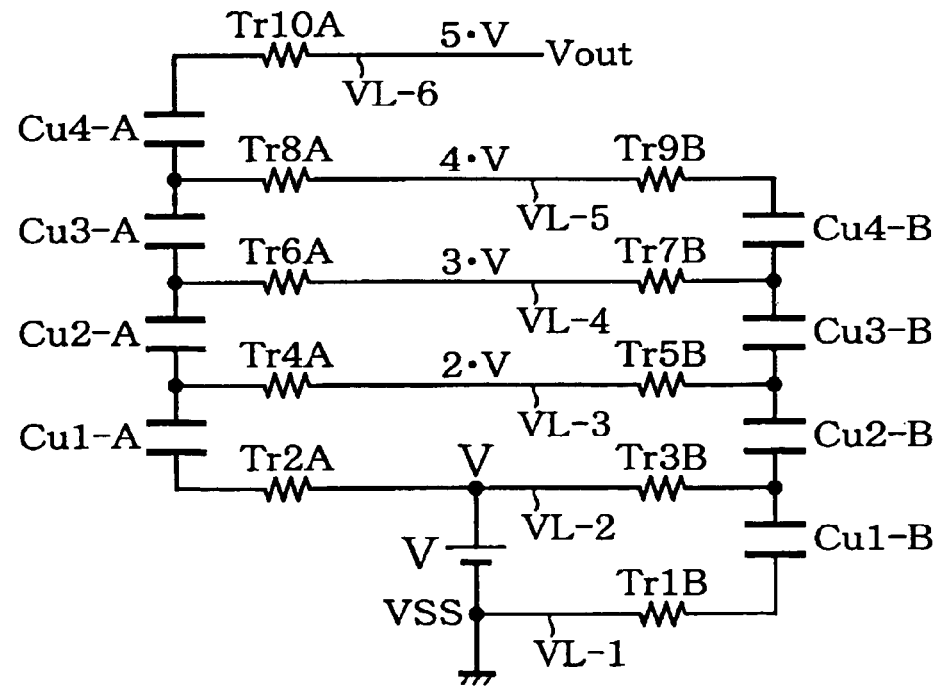

FIGS. 21A and 21B show equivalent circuits of the booster circuit 450. FIG. 21A shows an equivalent circuit of the booster circuit 450 in the first period. FIG. 21B shows an equivalent circuit of the booster circuit 450 in the second period. A resistance element in each equivalent circuit shows the ON resistance of the MOS transistor. A power supply in each equivalent circuit shows that the voltage V is applied between the first and second power supply lines VL-1 and VL-2.

The operation of the booster circuit 450 is the same as described with reference to FIGS. 3, 5A, and 5B in each period. Therefore, description of the operation is omitted.

In FIG. 19, a stabilization capacitor may be provided between each power supply line in order to stabilize the voltage of each power supply line.

Figure 22:
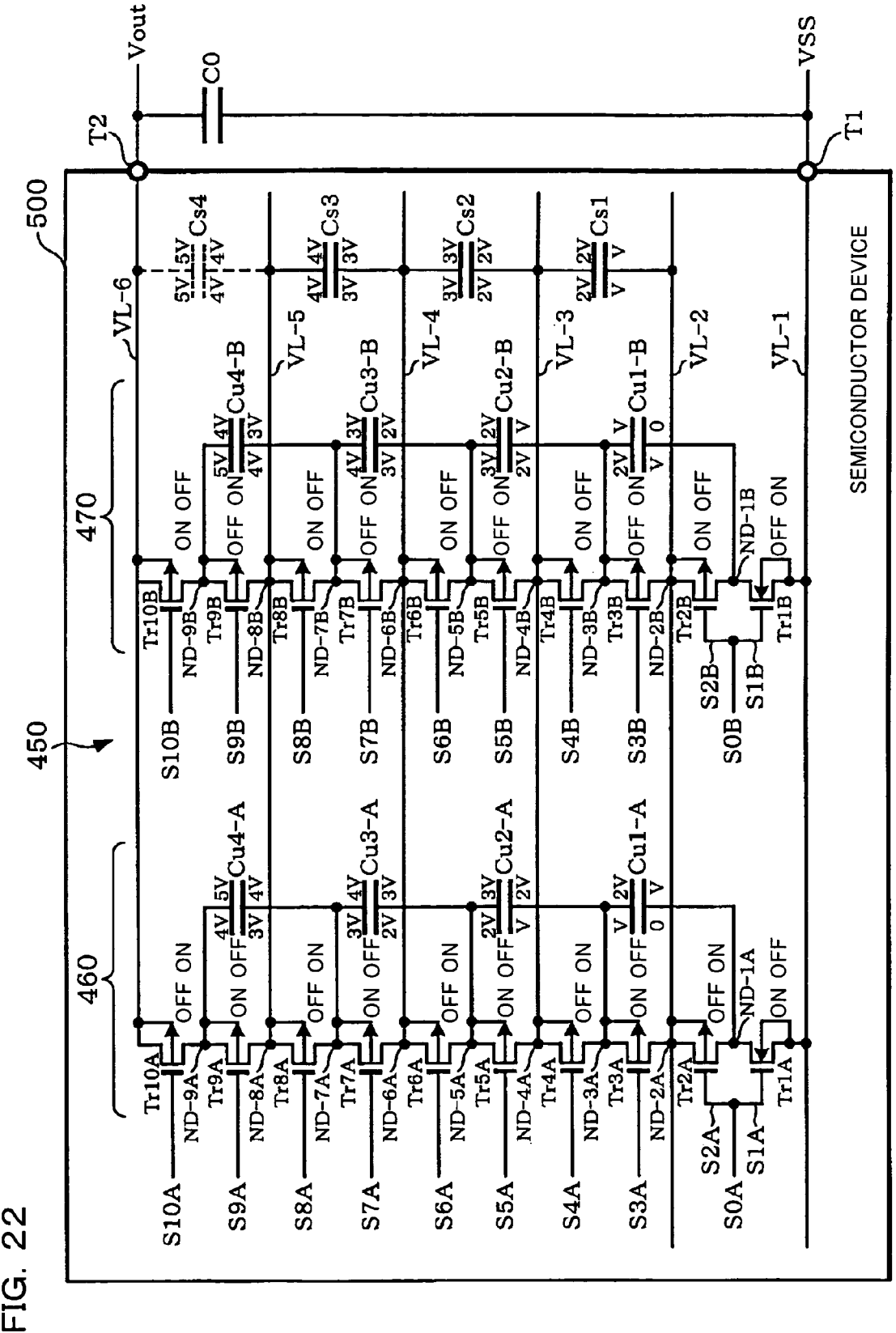
FIG. 22 is a diagram showing the configuration of another semiconductor device according to one embodiment of the present invention.

FIG. 22 shows the configuration of another semiconductor device according to one embodiment of the present invention. In FIG. 22, components that are the same as those in FIG. 19 are denoted by the same reference numbers, and further description thereof is omitted.

The semiconductor device shown in FIG. 22 has a configuration in which stabilization capacitors are further connected to the semiconductor device shown in FIG. 19. In more detail, the semiconductor device shown in FIG. 22 includes first to (N−2)th stabilization capacitors, one end of each of the stabilization capacitors being connected to a kth connection node (2≦k≦2N−4, k is an even number) to which the kth and (k+1)th switching elements are connected, and the other end of each of the stabilization capacitors being connected to a (k+2)th connection node to which the (k+2)th and (k+3)th switching elements are connected.

FIG. 22 shows the configuration when N is five. Specifically, the first stabilization capacitor Cs1 is connected between the second connection node ND-2A (ND-2B) and the fourth connection node ND-4A (ND-4B). The second connection node ND-2A (ND-2B) is a node to which a source terminal of the MOS transistor Tr2A (Tr2B) as the second switching element SW2A (SW2B) and a drain terminal of the MOS transistor Tr3A (Tr3B) as the third switching element SW3A (SW3B) are connected. The connection nodes ND-2A and ND-2B are electrically connected and are at the same potential. The fourth connection node ND-4A (ND-4B) is a node to which a source terminal of the MOS transistor Tr4A (Tr4B) as the fourth switching element SW4A (SW4B) and a drain terminal of the MOS transistor Tr5A (Tr5B) as the fifth switching element SW5A (SW5B) are connected. The connection nodes ND-4A and ND-4B are electrically connected and are at the same potential.

The second stabilization capacitor Cs2 is connected between the fourth connection node ND-4A (ND-4B) and the sixth connection node ND-6A (ND-6B). The third stabilization capacitor Cs3 is connected between the sixth connection node ND-6A (ND-6B) and the eighth connection node ND-8A (ND-8B).

An (N−1)th stabilization capacitor connected between the Nth power supply line and the (N+1)th power supply line may be further provided. Specifically, in the semiconductor device 500 shown in FIG. 22 which shows the case where N is five, the fourth stabilization capacitor Cs4 may be further connected between the fifth and sixth power supply lines VL-5 and VL-6.

Figure 23A:
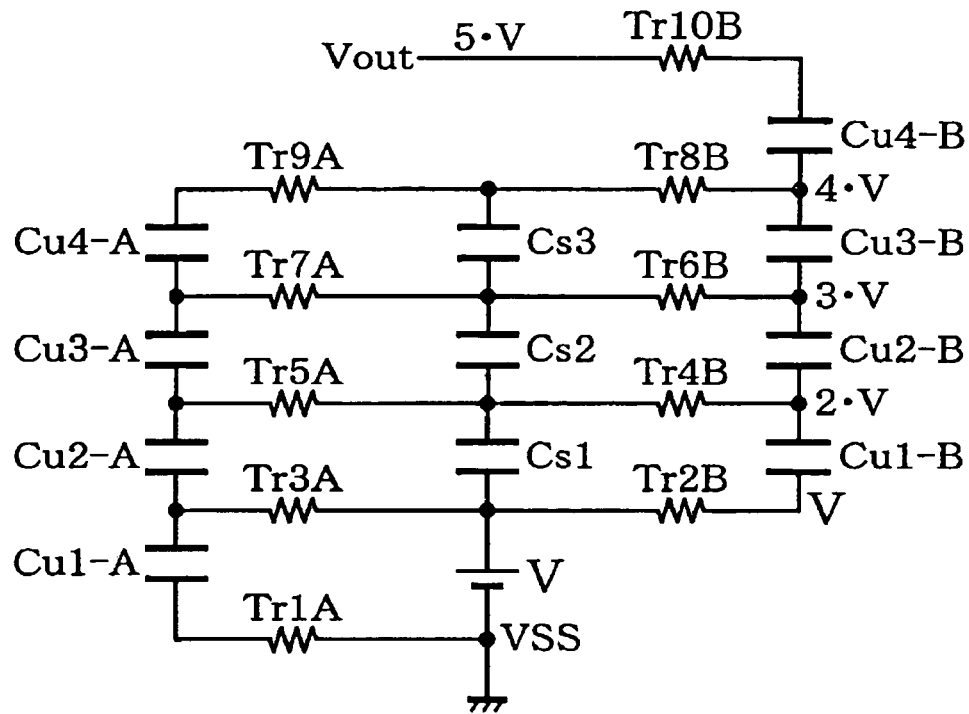
FIGS. 23A and 23B are equivalent circuit diagrams of the booster circuit shown in FIG. 22.
Figure 23B:
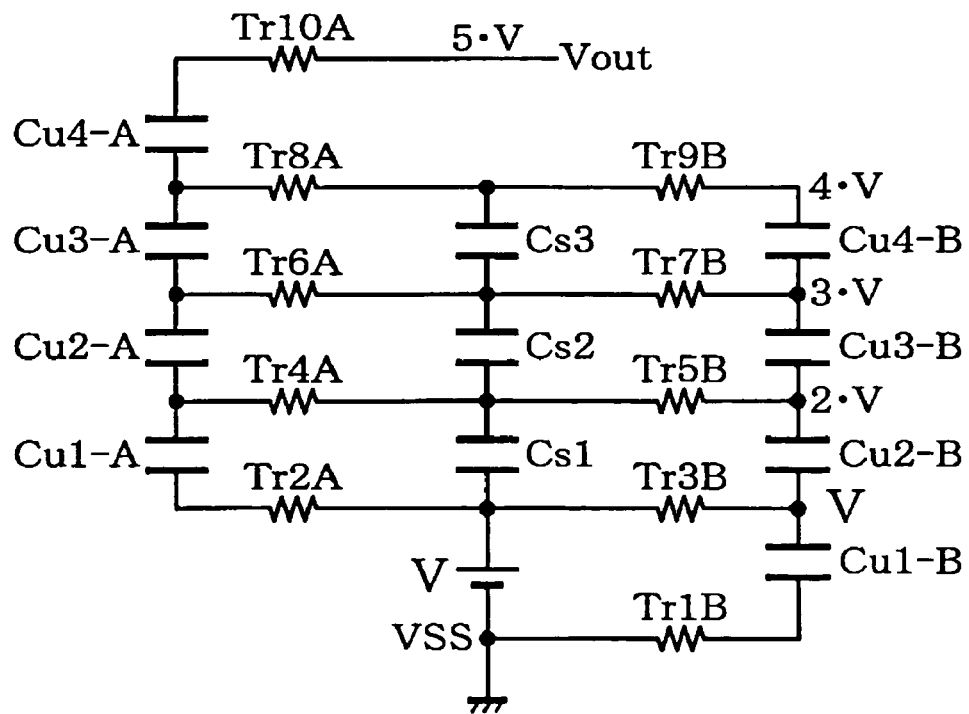

FIGS. 23A and 23B show equivalent circuits of the booster circuit shown in FIG. 22. FIGS. 23A and 23B show equivalent circuits in the case where the fourth stabilization capacitor Cs4 is omitted. FIG. 23A shows an equivalent circuit of the booster circuit shown in FIG. 22 in the first period. FIG. 23B shows an equivalent circuit of the booster circuit shown in FIG. 22 in the second period. A resistance element in each equivalent circuit shows the ON resistance of the MOS transistor. A power supply in each equivalent circuit shows that the voltage V is applied between the first and second power supply lines VL-1 and VL-2.

3.1 Voltage Regulation

In the booster circuit 450 of the semiconductor device 500 in this embodiment, the voltage boosted by the booster circuit 450 may be regulated by regulating the voltage between the first and second power supply lines of the booster circuit 450 as described below.

Figure 24:
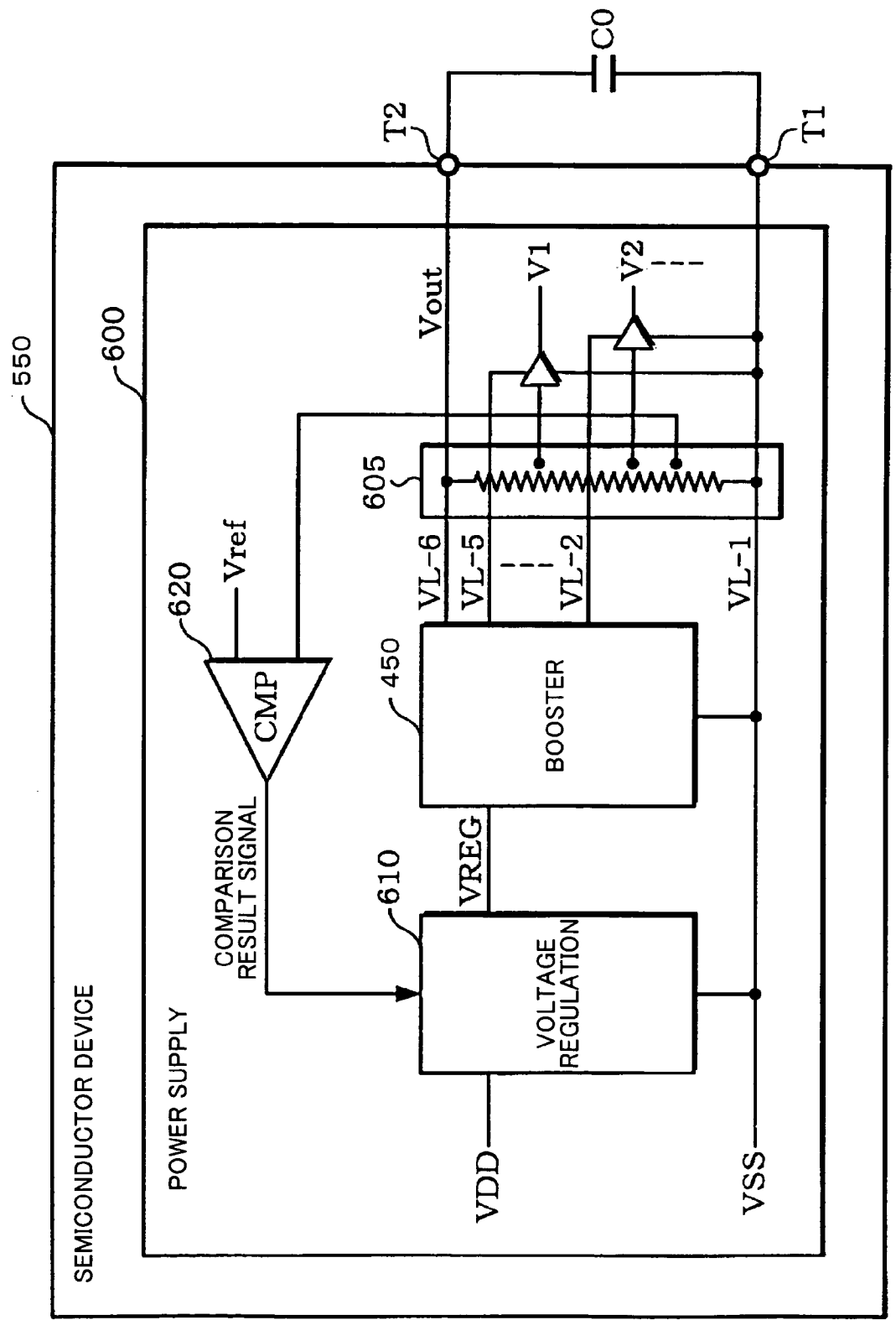
FIG. 24 is a diagram showing a first example of the configuration of a semiconductor device including a power supply circuit which outputs a voltage obtained by regulating a boosted voltage of a booster circuit.

FIG. 24 shows a first example of the configuration of a semiconductor device including a power supply circuit which outputs a voltage obtained by regulating the boosted voltage of the booster circuit. In FIG. 24, components that are the same as those of the semiconductor device 500 shown in FIG. 19 are denoted by the same reference numbers and further description thereof is omitted.

A semiconductor device 550 shown in FIG. 24 includes a power supply circuit 600. The power supply circuit 600 includes the booster circuit 450 shown in FIG. 19, and outputs one or more voltages (V1, V2, ...) obtained by regulating the boosted voltage of the booster circuit 450.

The semiconductor device 550 includes the first and second terminals T1 and T2 in the same manner as the semiconductor device 500 shown in FIG. 19. The first and sixth power supply lines VL-1 and VL-6 of the booster circuit 450 are respectively connected with the first and second terminals T1 and T2. The capacitor C0 is connected (externally provided) between the first and second terminals T1 and T2 outside the semiconductor device 550.

The power supply circuit 600 includes a multi-valued voltage generation circuit 605. The multi-valued voltage generation circuit 605 generates the multi-valued voltages V1, V2, ... based on the voltage between the first and sixth power supply lines VL-1 and VL-6 (first and (N+1)th power supply lines in a broad sense). The multi-valued voltage generation circuit 605 regulates intermediate voltages of the second to fifth power supply lines VL-2 to VL-5 by using a regulator, and outputs the regulated voltages as the multi-valued voltages V1, V2, ... The multi-valued voltages generated by the multi-valued voltage generation circuit 605 are used to drive an electro-optical device, for example.

Specifically, the boosted voltage output to the sixth power supply line VL-6 is directly output from the power supply circuit 600. This is achieved by stabilizing the output voltage Vout of the booster circuit 450 by providing the fourth stabilization capacitor Cs4 as shown in FIG. 22, for example. The power supply circuit 600 includes a voltage regulation circuit 610 and a comparison circuit 620. The voltage regulation circuit 610 outputs a regulated voltage VREG obtained by regulating the voltage between the high-potential-side voltage system power supply voltage VDD and the low-potential-side ground power supply voltage VSS. The regulated voltage VREG is supplied to the second power supply line VL-2 of the booster circuit 450.

The comparison circuit 620 compares a reference voltage Vref with the divided voltage based on the boosted voltage of the booster circuit 450, and outputs the comparison result to the voltage regulation circuit 610. In more detail, the comparison circuit 620 compares the reference voltage Vref with the divided voltage obtained by dividing the voltage between the first and sixth power supply lines VL-1 and VL-6 (first and (N+1)th power supply lines in a broad sense), and outputs a comparison result signal corresponding to the comparison result. The voltage regulation circuit 610 outputs the regulated voltage VREG obtained by regulating the voltage between the high-potential-side system power supply voltage VDD and the low-potential-side ground power supply voltage VSS based on the comparison result signal from the comparison circuit 620.

Figure 25:
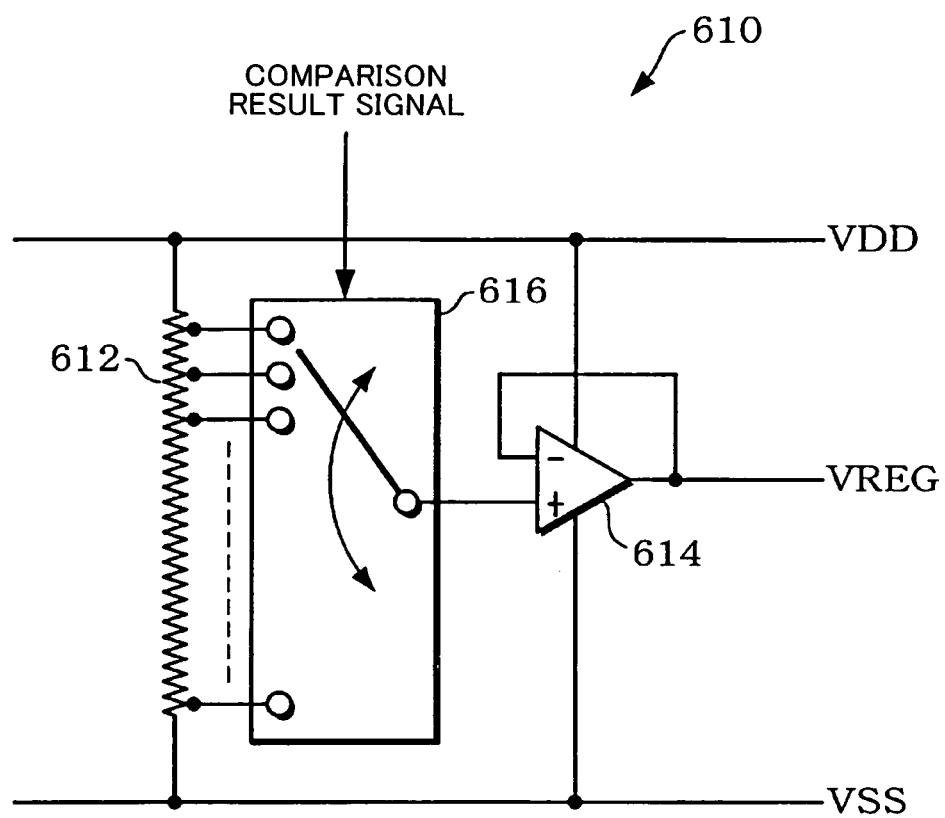
FIG. 25 is a block diagram showing the configuration of the voltage regulation circuit shown in FIG. 24.

FIG. 25 shows the configuration of the voltage regulation circuit 610. The voltage regulation circuit 610 includes a voltage divider circuit 612, a voltage-follower-connected operational amplifier 614, and a switch circuit 616.

The voltage divider circuit 612 includes a resistance element connected between the system power supply voltage VDD and the ground power supply voltage VSS, and outputs one of the divided voltages of the voltage between the system power supply voltage VDD and the ground power supply voltage VSS.

The operational amplifier 614 is connected between the system power supply voltage VDD and the ground power supply voltage VSS. The operational amplifier 614 outputs the regulated voltage VREG. The output of the operational amplifier 614 is negatively fed back.

The switch circuit 616 connects the voltage dividing point of the voltage divider circuit 612 with the input of the operational amplifier 614. The switch circuit 616 connects one of the voltage dividing points of the voltage divider circuit 612 with the input of the operational amplifier 614 based on the comparison result signal from the comparison circuit 620.

In FIGS. 24 and 25, the voltage is regulated based on the comparison result between the divided voltage obtained by dividing the voltage between the first and (N+1)th power supply lines and the reference voltage. However, the present invention is not limited thereto. For example, the voltage may be regulated based on the comparison result between the reference voltage Vref and the output voltage (Vout).

Figure 26:
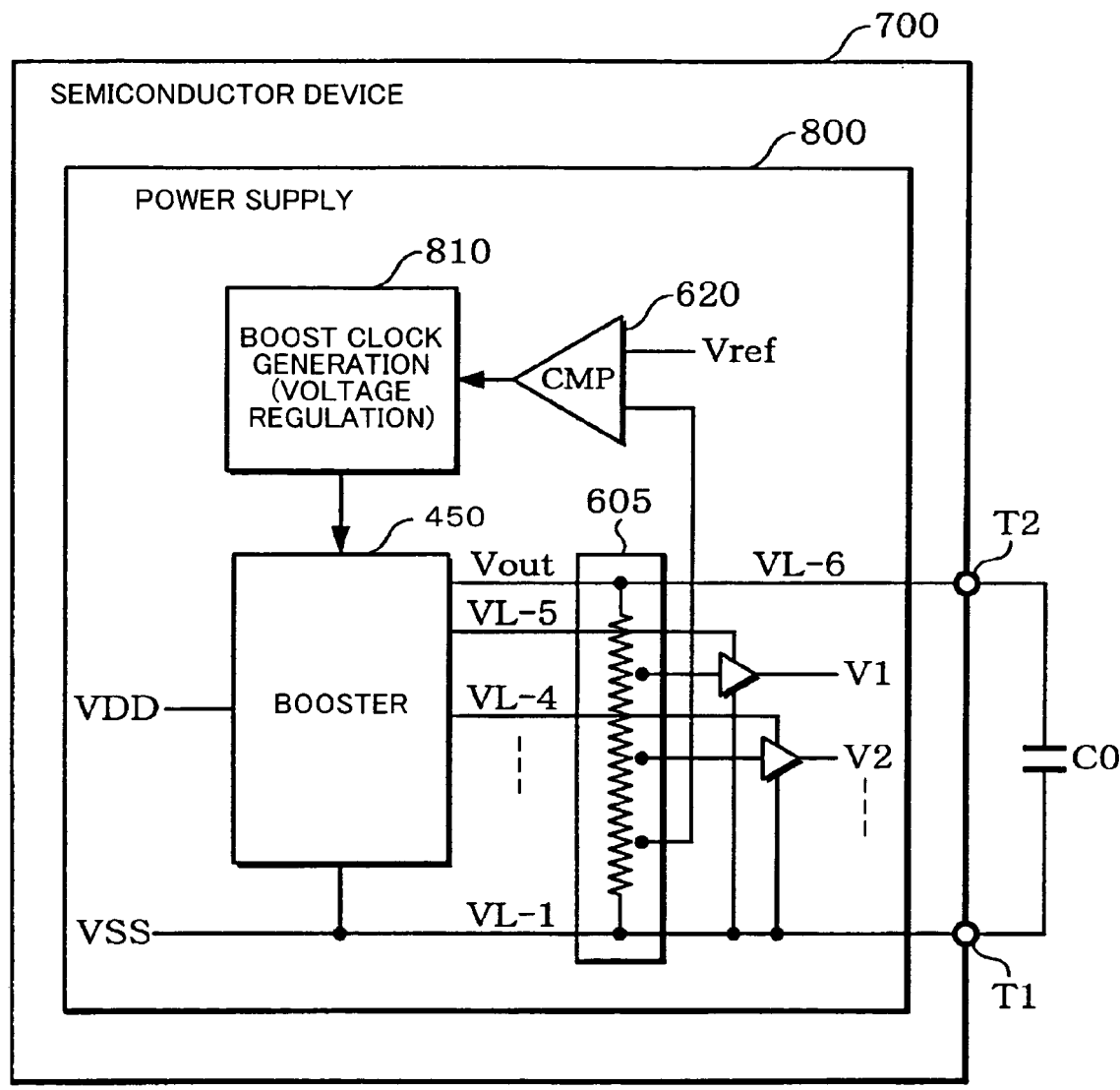
FIG. 26 is a diagram showing a second example of the configuration of a semiconductor device including a power supply circuit which outputs a voltage obtained by regulating a boosted voltage of a booster circuit.

FIG. 26 shows a second example of the configuration of a semiconductor device including a power supply circuit which outputs voltage obtained by regulating the boosted voltage of the booster circuit. In FIG. 26, components that are the same as those of the semiconductor device 500 shown in FIG. 19 are denoted by the same reference numbers and further description thereof is omitted.

A semiconductor device 700 shown in FIG. 26 includes a power supply circuit 800. The power supply circuit 800 includes the booster circuit 450 shown in FIG. 19 in the same manner as the power supply circuit 600 shown in FIG. 24, and outputs one or more voltages (V1, V2, ...) obtained by regulating the boosted voltage of the booster circuit 450.

The power supply circuit 800 includes a multi-valued voltage generation circuit 605, a comparison circuit 620, and a boost clock generation circuit 810 (voltage regulation circuit in a broad sense). The boost clock generation circuit 810 changes the frequencies of the boost clock signals (switch control signals S1 to S10) based on the comparison result from the comparison circuit 620. In more detail, the boost clock generation circuit 810 changes the frequency of the switch control signals for ON/OFF controlling the MOS transistors (first to 2Nth switching elements in a broad sense) as the first to tenth switching elements in the booster circuit 450 based on the comparison result between the reference voltage Vref and the divided voltage obtained by dividing the voltage between the first and sixth power supply lines VL-1 and VL-6 (first and (N+1)th power supply lines in a broad sense).

For example, the boost clock generation circuit 810 increases the frequency of the switch control signal so that the output voltage Vout is increased. The boost clock generation circuit 810 decreases the frequency of the switch control signal so that the output voltage Vout is decreased.

4. Application to Display Device

An application example of the semiconductor device including the above-described booster circuit to a display device is described below.

Figure 27:
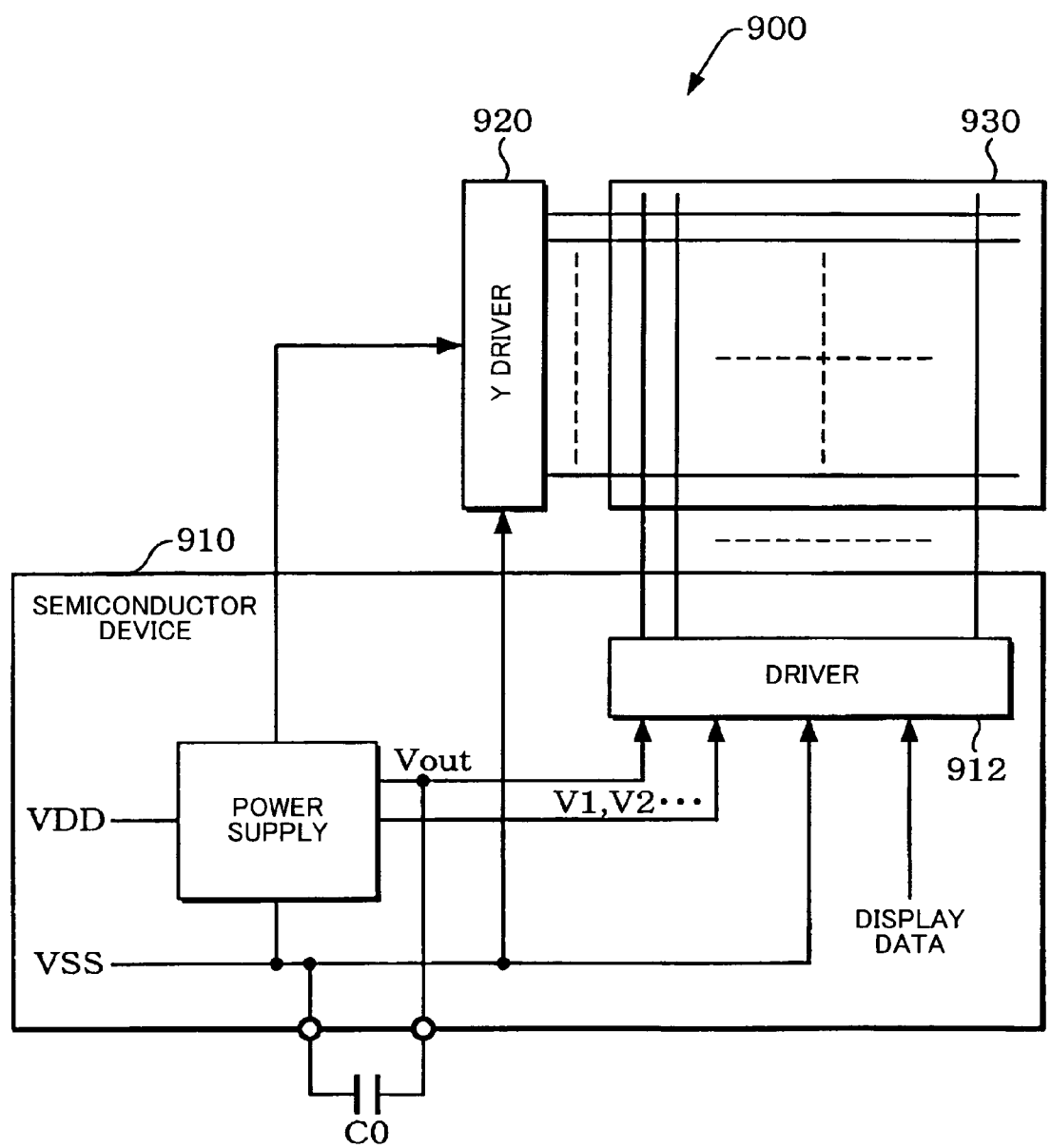
FIG. 27 is a diagram showing the configuration of a display device.

FIG. 27 shows an example of the configuration of such a display device. FIG. 27 shows a liquid crystal display device.

A liquid crystal display device 900 includes a semiconductor device 910, a Y driver 920 (scanning driver in a broad sense), and a liquid crystal display panel 930 (electro-optical device in a broad sense).

At least one of the semiconductor device 910 and the Y driver 920 may be formed on a panel substrate of the liquid crystal display panel 930. The Y driver 920 may be included in the semiconductor device 910.

The liquid crystal display panel 930 includes a plurality of scanning lines, a plurality of data lines, and a plurality of pixels. Each pixel is disposed corresponding to the intersecting point of the scanning line and the data line. The scanning lines are scanned by the Y driver 920. The data lines are driven by the semiconductor device 910. Specifically, the semiconductor device 910 is applied to a data driver.

As the semiconductor device 910, the semiconductor device 550 shown in FIG. 24 or the semiconductor device 700 shown in FIG. 26 may be employed. In this case, the semiconductor device 910 includes a driver section 912.

The driver section 912 drives the liquid crystal display panel 930 (electro-optical device) by using the voltage between the first and (N+1)th power supply lines. In more detail, multi-valued voltages generated by a power supply circuit (power supply circuit 600 or power supply circuit 800) is supplied to the driver section 912. The driver section 912 selects a voltage corresponding to display data from the multi-valued voltages, and outputs the selected voltage to the data line of the liquid crystal display panel 930.

A high voltage is generally necessary in the Y driver 920. The power supply circuit of the semiconductor device 910 supplies a high voltage such as +15 V or −15 V to the Y driver 920. The power supply circuit supplies the output voltage Vout or the intermediate voltage V1, V2, . . . (or voltage obtained by regulating the intermediate voltage) to the driver section 912.

As examples of electronic instruments including the liquid crystal display device having such a configuration, a multimedia personal computer (PC), portable telephone, word processor, TV, view finder or direct view finder video tape recorder, electronic notebook, electronic desk calculator, car navigation system, wrist watch, clock, POS terminal, device provided with a touch panel, pager, minidisc player, IC card, remote controller for various electronic instruments, various measurement devices, and the like can be given.

As the liquid crystal display panel 930, a simple matrix liquid crystal display panel and a static drive liquid crystal display panel in which a switching element is not used for the panel, or an active matrix liquid crystal display panel using a three-terminal switching element represented by a TFT or a two-terminal switching element represented by an MIM may be used from the viewpoint of the drive method. From the viewpoint of electro-optical characteristics, various types of liquid crystal panels such as TN type, STN type, guest-host type, phase transition type, and ferroelectric type liquid crystal panels may be used.

The above description illustrates the case where the LCD display is used as the liquid crystal display panel. However, the present invention is not limited thereto. For example, various display devices such as an electroluminescent panel, plasma display panel, or field emission display (FED) panel may be used.

The present invention is not limited to the above-described embodiments. Various modifications are possible within the scope of the present invention.

The case where an additional device is included between the switching elements or between the capacitors in FIGS. 2, 3, 6, 17 to 19, 22, and 24 to 27 is also included in the equivalent range of the present invention.

Part of requirements of any claim of the present invention could be omitted from a dependent claim which depends on that claim. Moreover, part of requirements of any independent claim of the present invention could be made to depend on any other independent claim.

Various features relating to the above description will be shown below.

According to one embodiment of the present invention, there is provide a booster circuit including a charge-pump circuit, the booster circuit comprising:

first to Mth power supply lines (M is an integer larger than 3); and first and second charge-pump circuits, wherein:

the first charge-pump circuit includes a first group of first to (M−2)th boost capacitors, the j1th boost capacitor ($1 \leq j1 \leq M-2$, j1 is an integer) being connected between the j1th power supply line and the (j1+1)th power supply line in a first period, and connected between the (j1+1)th power supply line and the (j1+2)th power supply line in a second period subsequent to the first period; and the second charge-pump circuit includes a second group of first to (M−2)th boost capacitors, the j2th boost capacitor ($1 \leq j2 \leq M-2$, j2 is an integer) being connected between the j2th power supply line and the (j2+1)th power supply line in the second period, and connected between the (j2+1)th power supply line and the (j2+2)th power supply line in the first period.

This enables to lower the voltage applied to each constituent element of the booster circuit. Therefore, manufacturing cost can be reduced. In the first period, the voltage boosted by the second charge-pump circuit is output between the first and Mth power supply lines VL-1 and VL-M. In the second period, the voltage boosted by the first charge-pump circuit is output between the first and Mth power supply lines VL-1 and VL-M. Therefore, the boosted voltage does not drop in the first period and the second period even if the current is flown by the load connected to the Mth power supply line, whereby a stable voltage can be output.

The booster circuit may further comprise first to (M−3)th stabilization capacitors, the kth stabilization capacitor ($1 \leq k \leq M-3$, k is an integer) being connected between the (k+1)th power supply line and the (k+2)th power supply line.

The booster circuit may further comprise an (M−2)th stabilization capacitor connected between the (M−1)th power supply line and the Mth power supply line.

The booster circuit may comprise a capacitor connected between the first and Mth power supply lines.

By connecting the stabilization capacitors, a voltage of each power supply line can be stabilized.

According to one embodiment of the present invention, there is provided a booster circuit including a charge-pump circuit, the booster circuit comprising:

first to (N+1)th power supply lines (N is an integer larger than 2); and first and second charge-pump circuits, wherein the first charge-pump circuit includes:

a first group of first to 2Nth switching elements, one end of the first switching element being connected to the first power supply line, one end of the 2Nth switching element being connected to the (N+1)th power supply line, and the remaining switching elements excluding the first and 2Nth switching elements being connected in series between the other end of the first switching element and the other end of the 2Nth switching element; and a first group of first to (N−1)th boost capacitors, one end of each of the boost capacitors being connected to a j1th connection node ($1 < j1 \leq 2N-3$, j1 is an odd number) to which the j1th and (j1+1)th switching elements are connected, and the other end of each of the boost capacitors being connected to a (j1+2)th connection node to which the (j1+2)th and (j1+3)th switching elements are connected;

wherein the switching elements are controlled so that one of the m1th switching element ($1 \leq m1 \leq 2N-1$, m1 is an integer) and the (m1+1)th switching element in the first group is exclusively turned ON;

wherein the second charge-pump circuit includes:

a second group of first to 2Nth switching elements, one end of the first switching element being connected to the first power supply line, one end of the 2Nth switching element being connected to the (N+1)th power supply line, and the remaining switching elements excluding the first and 2Nth switching elements being connected in series between the other end of the first switching element and the other end of the 2Nth switching element; and a second group of first to (N−1)th boost capacitors, one end of each of the boost capacitors being connected with a j2th connection node ($1 \leq j2 \leq 2N-3$, j2 is an odd number) to which the j2th and (j2+1)th switching elements are connected, and the other end of the boost capacitor being connected with a (j2+2)th connection node to which the (j2+2)th and (j2+3)th switching elements are connected;

wherein the switching elements are controlled so that one of the m2th switching element ($1 \leq m2 \leq 2N-1$, m2 is an integer) and the (m2+1)th switching element in the second group is exclusively turned ON;

wherein the switching elements are controlled so that the mth switching element ($1 \leq m \leq 2N$, m is an integer) in the first group is turned ON when the mth switching element in the second group is turned OFF in a first period; and wherein the switching elements are controlled so that the mth switching element in the first group is turned OFF when the mth switching element in the second group is turned ON in a second period subsequent to the first period.

The booster circuit may further comprise first to (N−2)th stabilization capacitors, one end of each of the stabilization capacitors being connected to a kth connection node ($2 \leq k \leq 2N-4$, k is an even number) to which the kth and (k+1)th switching elements are connected, and the other end of each of the stabilization capacitors being connected to a (k+2)th connection node to which the (k+2)th and (k+3)th switching elements are connected.

The booster circuit may comprise an (N−1)th stabilization capacitor connected between the Nth power supply line and the (N+1)th power supply line.

The booster circuit may comprise a capacitor connected between the first and (N+1)th power supply lines.

In the booster circuit, a voltage between the first and second power supply lines may be applied to each of the boost capacitors.

The switching element, the boost capacitor, and the stabilization capacitor which make up the booster circuit can be formed by the low-voltage manufacturing process. Moreover, in the case of implementing the switching element by using a conventional MOS transistor, it becomes possible to manufacture the MOS transistor by the low-voltage manufacturing process, so that the charge/discharge current due to the gate capacitance of the MOS transistor can be reduced.

Furthermore, in comparison with a conventional charge-pump booster circuit, when capacitors are provided in the same area of the semiconductor device (by same cost) and the same output impedance (having same property) is obtained, since the charge/discharge frequency of the capacitor can be lowered, current consumption accompanying switching can be reduced. In addition, since the capacitor can be formed by the low-voltage manufacturing process, the charge/discharge current due to the parasitic capacitance of the capacitor can be significantly reduced.

In the first period, a voltage boosted by the second charge-pump circuit is output between the first and Mth power supply lines VL-1 and VL-M. In the second period, a voltage boosted by the first charge-pump circuit is output between the first and Mth power supply lines VL-1 and VL-M. Therefore, the boosted voltage does not drop in the first period and the second period even if the current is flown by the load connected to the Mth power supply line, whereby a stable voltage can be output.

According to one embodiment of the present invention, there is provided a booster circuit which outputs a boosted voltage to an output power supply line connected to a load, the booster circuit comprising:

a boosted voltage generation circuit which generates a boosted voltage obtained by boosting a given voltage and supplies the boosted voltage to a boost power supply line;

a switching element which electrically connects the boost power supply line to the output power supply line or disconnects the boost power supply line from the output power supply line;

a charge hold circuit which holds an electric charge of the output power supply line; and a charge supply circuit connected to the output power supply line, wherein the charge supply circuit supplies an electric charge to the output power supply line when the switching element electrically disconnects the boost power supply line from the output power supply line.

According to one embodiment of the present invention, there is provided a semiconductor device comprising the above booster circuit.

The semiconductor device may further comprise first and second terminals electrically connected to the first and (N+1)th power supply lines, wherein a capacitor is connected between the first and second terminals outside the semiconductor device.

The semiconductor device may further comprise a voltage regulation circuit which regulates a voltage, wherein a voltage regulated by the voltage regulation circuit is supplied as a voltage between the first and second power supply lines.

In the semiconductor device, the voltage regulation circuit may regulate a voltage based on comparison result between a reference voltage and a voltage between the first and (N+1)th power supply lines or a divided voltage obtained by dividing the voltage between the first and (N+1)th power supply lines.

The semiconductor device may further comprise a voltage regulation circuit which changes the frequency of a switch control signal for ON/OFF control of the first to 2Nth switching elements, based on comparison result between a divided voltage obtained by dividing a voltage between the first and (N+1)th power supply lines and a reference voltage.

In the semiconductor device, a voltage between the first and second power supply lines may be applied to each of the boost capacitors.

Reduction of cost and power consumption of the semiconductor device which generates a boosted voltage with high accuracy can be thus implemented.

The semiconductor device may further comprise a multi-valued voltage generation circuit which generates multi-valued voltages based on a voltage between the first and (N+1)th power supply lines.

The semiconductor device may further comprise a driver section which drives an electro-optical device based on the multi-valued voltages generated by the multi-valued voltage generation circuit.

Therefore, the drive voltage can be generated with high accuracy, so that a semiconductor device implementing high display quality drive can be provided.

According to one embodiment of the present invention, there is provided a display device comprising: a plurality of scanning lines; a plurality of data lines; a plurality of pixels; a scanning driver which drives the scanning lines; and the above semiconductor device which drives the data lines.

By implementing a semiconductor device with a reduced cost and power consumption, a display device with a reduced cost and power consumption can be provided.

What is claimed is:

1. A booster circuit including a charge-pump circuit, the booster circuit comprising:
   first to Mth power supply lines (M is an integer larger than 3); and
   first and second charge-pump circuits,
   the first charge-pump circuit includes a first group of first to (M−2)th boost capacitors, the j1th boost capacitor ($1 \leq j1 \leq M-2$, j1 is an integer) being connected between the j1th power supply line and the (j1+1)th power supply line in a first period, and connected between the (j1+1)th power supply line and the (j1+2)th power supply line in a second period after the first period; and
   the second charge-pump circuit includes a second group of first to (M−2)th boost capacitors, the j2th boost capacitor ($1 \leq j2 \leq M-2$, j2 is an integer) being connected between the j2th power supply line and the (j2+1)th power supply line in the second period, and connected between the (j2+1)th power supply line and the (j2+2)th power supply line in the first period.

2. The booster circuit as defined in claim 1, further comprising:
   first to (M−3)th stabilization capacitors, the kth stabilization capacitor ($1 \leq k \leq M-3$, k is an integer) being connected between the (k+1)th power supply line and the (k+2)th power supply line.

3. The booster circuit as defined in claim 2, further comprising:
   an (M−2)th stabilization capacitor connected between the (M−1)th power supply line and the Mth power supply line.

4. The booster circuit as defined in claim 1, comprising:
   a capacitor connected between the first and Mth power supply lines.

5. A booster circuit including a charge-pump circuit, the booster circuit comprising:
   first to (N+1)th power supply lines (N is an integer larger than 2); and
   first and second charge-pump circuits,
   the first charge-pump circuit including:
   a first group of first to 2Nth switching elements, one end of the first switching element being connected to the first power supply line, one end of the 2Nth switching element being connected to the (N+1)th power supply line, and the remaining switching elements excluding the first and 2Nth switching elements being connected in series between the other end of the first switching element and the other end of the 2Nth switching element; and
   a first group of first to (N−1)th boost capacitors, one end of each of the boost capacitors being connected to a j1th connection node ($1 \leq j1 \leq 2N-3$, j1 is an odd number) to which the j1th and (j1+1)th switching elements are connected, and the other end of each of the boost capacitors being connected to a (j1+2)th connection node to which the (j1+2)th and (j1+3)th switching elements are connected;
   the switching elements are controlled so that one of the m1th switching element ($1 \leq m1 \leq 2N-1$, m1 is an integer) and the (m1+1)th switching element in the first group is exclusively turned ON;
   the second charge-pump circuit including:
   a second group of first to 2Nth switching elements, one end of the first switching element being connected to the first power supply line, one end of the 2Nth switching element being connected to the (N+1)th power supply line, and the remaining switching elements excluding the first and 2Nth switching elements being connected in series between the other end of the first switching element and the other end of the 2Nth switching element; and
   a second group of first to (N−1)th boost capacitors, one end of each of the boost capacitors being connected with a j2th connection node ($1 \leq j2 \leq 2N-3$, j2 is an odd number) to which the j2th and (j2+1)th switching elements are connected, and the other end of the boost capacitor being connected with a (j2+2)th connection node to which the (j2+2)th and (j2+3)th switching elements are connected;
   the switching elements being controlled so that one of the m2th switching element ($1 \leq m2 \leq 2N-1$, m2 is an integer) and the (m2+1)th switching element in the second group is exclusively turned ON;
   the switching elements being controlled so that the mth switching element ($1 \leq m \leq 2N$, m is an integer) in the first group is turned ON when the mth switching element in the second group is turned OFF in a first period; and
   the switching elements being controlled so that the mth switching element in the first group is turned OFF when the mth switching element in the second group is turned ON in a second period subsequent to the first period.

6. The booster circuit as defined in claim 5, further comprising:
   first to (N−2)th stabilization capacitors, one end of each of the stabilization capacitors being connected to a kth connection node ($2 \leq k \leq 2N-4$, k is an even number) to which the kth and (k+1)th switching elements are connected, and the other end of each of the stabilization capacitors being connected to a (k+2)th connection node to which the (k+2)th and (k+3)th switching elements are connected.

7. The booster circuit as defined in claim 6, further comprising:
   an (N−1)th stabilization capacitor connected between the Nth power supply line and the (N+1)th power supply line.

8. The booster circuit as defined in claim 5, comprising:
   a capacitor connected between the first and (N+1)th power supply lines.

9. The booster circuit as defined in claim 1,
   a voltage between the first and second power supply lines being applied to each of the boost capacitors.

10. The booster circuit as defined in claim 5,
    a voltage between the first and second power supply lines being applied to each of the boost capacitors.

11. A semiconductor device comprising the booster circuit as defined in claim 5.

12. The semiconductor device as defined in claim 11, further comprising:
    first and second terminals electrically connected to the first and (N+1)th power supply lines,
    a capacitor being connected between the first and second terminals outside the semiconductor device.

13. The semiconductor device as defined in claim 11, further comprising:
    a voltage regulation circuit which regulates a voltage,
    a voltage regulated by the voltage regulation circuit being supplied as a voltage between the first and second power supply lines.

14. The semiconductor device as defined in claim 13,
    the voltage regulation circuit regulating a voltage based on comparison result between a reference voltage and a voltage between the first and (N+1)th power supply lines or a divided voltage obtained by dividing the voltage between the first and (N+1)th power supply lines.

15. The semiconductor device as defined in claim 11, further comprising:
a voltage regulation circuit which changes the frequency of a switch control signal for ON/OFF control of the first to 2Nth switching elements, based on comparison result between a divided voltage obtained by dividing a voltage between the first and (N+1)th power supply lines and a reference voltage.

16. The semiconductor device as defined in claim 11,
a voltage between the first and second power supply lines being applied to each of the boost capacitors.

17. The semiconductor device as defined in claim 11, further comprising:
a multi-valued voltage generation circuit which generates multi-valued voltages based on a voltage between the first and (N+1)th power supply lines.

18. The semiconductor device as defined in claim 17, further comprising:
a driver section which drives an electro-optical device based on the multi-valued voltages generated by the multi-valued voltage generation circuit.

19. A display device comprising:

a plurality of scanning lines;

a plurality of data lines;

a plurality of pixels;

a scanning driver which drives the scanning lines; and the semiconductor device as defined in claim 18 which drives the data lines.

* * * * *

UNITED STATES PATENT AND TRADEMARK OFFICE
CERTIFICATE OF CORRECTION

PATENT NO. : 7,554,537 B2  Page 1 of 1
APPLICATION NO. : 10/859249
DATED : June 30, 2009
INVENTOR(S) : Haruo Kamijo It is certified that error appears in the above-identified patent and that said Letters Patent is hereby corrected as shown below:

Title page, column 1, section(*), after "Notice: Subject to any disclaimer, the term of this patent is extended or adjusted under 35 U.S.C. 154(b) by 1086 days."

Please insert:

--This patent is subject to a terminal disclaimer.--

Signed and Sealed this

Fifteenth Day of September, 2009

David J. Kappos
*Director of the United States Patent and Trademark Office*